(12) United States Patent
Xie et al.

(10) Patent No.: US 12,248,621 B2
(45) Date of Patent: Mar. 11, 2025

(54) IDENTIFICATION METHOD AND WIRELESS MOTION CAPTURING SYSTEM

(71) Applicant: Wistron Corporation, New Taipei (TW)

(72) Inventors: Zhu-Xuan Xie, New Taipei (TW); Chih-Hao Chiu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 18/302,777

(22) Filed: Apr. 18, 2023

(65) Prior Publication Data

US 2024/0302890 A1    Sep. 12, 2024

(30) Foreign Application Priority Data

Mar. 7, 2023 (TW) ................. 112108193

(51) Int. Cl.
*G06F 3/01* (2006.01)
*G01C 19/5776* (2012.01)
*G06T 13/40* (2011.01)

(52) U.S. Cl.
CPC .......... *G06F 3/011* (2013.01); *G01C 19/5776* (2013.01); *G06T 13/40* (2013.01)

(58) Field of Classification Search
CPC ...... G06F 3/011; G01C 19/5776; G06T 13/04
See application file for complete search history.

(56) References Cited

U.S. PATENT DOCUMENTS

| | | | | |
|---|---|---|---|---|
| 10,065,074 | B1* | 9/2018 | Hoang | G01P 1/02 |
| 11,436,806 | B1* | 9/2022 | Katz | A61B 5/7425 |
| 2008/0211768 | A1* | 9/2008 | Breen | G06F 3/012 |
| | | | | 345/157 |
| 2009/0204031 | A1* | 8/2009 | McNames | A61B 5/1126 |
| | | | | 600/595 |
| 2011/0234489 | A1* | 9/2011 | Van Acht | A61B 5/486 |
| | | | | 345/156 |
| 2011/0246123 | A1* | 10/2011 | DelloStritto | A61B 5/11 |
| | | | | 73/488 |
| 2015/0038806 | A1* | 2/2015 | Kaleal, III | A61B 5/4833 |
| | | | | 600/301 |
| 2017/0272842 | A1* | 9/2017 | Touma | A63B 24/0003 |
| 2017/0323483 | A1* | 11/2017 | Palmaro | G06T 19/20 |
| 2017/0332946 | A1* | 11/2017 | Kikkeri | A61B 5/1114 |
| 2018/0036531 | A1* | 2/2018 | Schwarz | A61B 5/332 |
| 2019/0176320 | A1* | 6/2019 | Smith | B25J 13/025 |
| 2019/0295306 | A1* | 9/2019 | Weston | A63F 13/56 |
| 2020/0306589 | A1* | 10/2020 | Jabr | A63B 24/0062 |
| 2021/0236935 | A1* | 8/2021 | Barr | A63F 13/213 |
| 2021/0286179 | A1* | 9/2021 | Miller, IV | G06F 3/013 |

(Continued)

FOREIGN PATENT DOCUMENTS

CN    107582062    1/2018

*Primary Examiner* — Ibrahim A Khan
(74) *Attorney, Agent, or Firm* — JCIPRNET

(57) ABSTRACT

An identification method applicable to a wireless motion capturing system with multiple wearable devices, which is used to capture the movements of a user operating a virtual avatar model. The identification method includes: receiving a sensor data, where the sensor data is associated with a motion feature, and the motion feature corresponds to nodes of the virtual avatar model; and analyzing the sensor data and identifying the wearable devices as at least one of the nodes.

19 Claims, 21 Drawing Sheets

(56) References Cited

U.S. PATENT DOCUMENTS

| | | | | |
|---|---|---|---|---|
| 2021/0322853 | A1* | 10/2021 | Lockhart | G06F 3/017 |
| 2021/0325974 | A1* | 10/2021 | Boissière | G06T 13/20 |
| 2022/0035452 | A1* | 2/2022 | Lockhart | G06N 3/08 |
| 2022/0054925 | A1* | 2/2022 | Chiang | A63B 71/0622 |
| 2022/0121284 | A1 | 4/2022 | Walsh | |
| 2023/0143628 | A1* | 5/2023 | Yee | G16H 50/70 |
| | | | | 705/2 |
| 2023/0210402 | A1* | 7/2023 | Su | A61B 5/6823 |
| | | | | 600/595 |
| 2023/0307959 | A1* | 9/2023 | Oba | G06F 3/014 |
| 2023/0343450 | A1* | 10/2023 | Aragones | A61B 5/1118 |
| 2024/0013410 | A1* | 1/2024 | Mochizuki | G06V 40/23 |
| 2024/0028129 | A1* | 1/2024 | Whitmire | G06F 1/163 |

\* cited by examiner

IDENTIFICATION METHOD AND WIRELESS MOTION CAPTURING SYSTEM

CROSS-REFERENCE TO RELATED APPLICATION

This application claims the priority benefit of Taiwan application serial no. 112108193, filed on Mar. 7, 2023. The entirety of the above-mentioned patent application is hereby incorporated by reference herein and made a part of this specification.

BACKGROUND

Technical Field

The disclosure relates to a wearable device technology, and in particular to an identification method and a wireless motion capturing system.

Description of Related Art

In existing wireless motion capturing systems, after a wearable device is connected, the user needs to set individually the nodes corresponding to the each wearing position of a virtual avatar model. However, either in the case where the user first sets the wearing position of the wearing device before wearing it, or in the case where the user first wears the wearing device, and then sequentially sets the nodes of the virtual avatar model corresponding to the wearing position of the wearing device, the process of setting wearable devices one by one is time-consuming and cumbersome for users. In practical use, if the user pre-sets a wrong node corresponding to the wearable device, it will take a long time to find out the wrongly set wearable device. Otherwise, it may need to reset all the wearable devices directly.

In the case where the wearing position of each wearable device is preset in the factory such that the user does not need to set the wearable device to the corresponding node of the wearable position individually. The user only needs to wear the wearable device according to the preset wearing position. However, the whole system of wearable devices will not work when one wearable device breaks down.

Motion of limb parts are linked to other limb parts of the virtual avatar model, which may cause inaccurate identification. Furthermore, for the body parts such as trunk and hip which are difficult to move in a user movement, may also result in problems of inaccurate identification.

SUMMARY

Accordingly, the disclosure provides an identification method and a wireless motion capturing system, which accurately identifies multiple devices corresponding to multiple nodes of a virtual avatar model through a simple procedure of user movement.

An embodiment of the disclosure provides an identification method, applicable to a wireless motion capturing system with a plurality of wearable devices, comprising: receiving sensor data, wherein the sensor data is associated with a motion feature, and the motion feature corresponds to a plurality of nodes of a virtual avatar model; and analyzing the sensor data and identifying at least one of the plurality of nodes corresponding to each of the plurality of wearable devices.

An embodiment of the disclosure provides an identification method, applicable to a wireless motion capturing system including a plurality of wearable devices for capturing movements of a user operating a virtual avatar model, wherein the virtual avatar model comprising at least one hand node, at least one head node, at least one central part node and at least one foot node, the identification method comprising: analyzing first sensor data and identifying the plurality of wearable devices as the at least one hand node, wherein the first sensor data is associated with a first motion feature, and the first motion feature corresponds to the at least one hand node of the virtual avatar model; analyzing second sensor data and identifying the plurality of wearable devices as the at least one head node, wherein the second sensor data is associated with a second motion feature, and the second motion feature corresponds to the at least one head node of the virtual avatar model; analyzing third sensor data and identifying the plurality of wearable devices as the at least one central part node, wherein the third sensor data is associated with a third motion feature, and the third motion feature corresponds to the at least one central part node of the virtual avatar model; and analyzing fourth sensor data and identifying the plurality of wearable devices as the at least one foot node, wherein the fourth sensor data is associated with a fourth motion feature, and the fourth motion feature corresponds to the at least one foot node of the virtual avatar model.

An embodiment of the disclosure provides a wireless motion capturing system for capturing movements of a user operating a virtual avatar model, the wireless motion capturing system comprising: a processing device; and a plurality of wearable devices that communicate with the processing device, wherein the wearable devices generate sensor data; the processing device receives the sensor data, wherein the sensor data is associated with a motion feature, and the motion feature corresponds to a plurality of nodes of the virtual avatar model, and the processing device analyzes the sensor data and identifies at least one of the plurality of nodes corresponding to each of the plurality of wearable devices.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
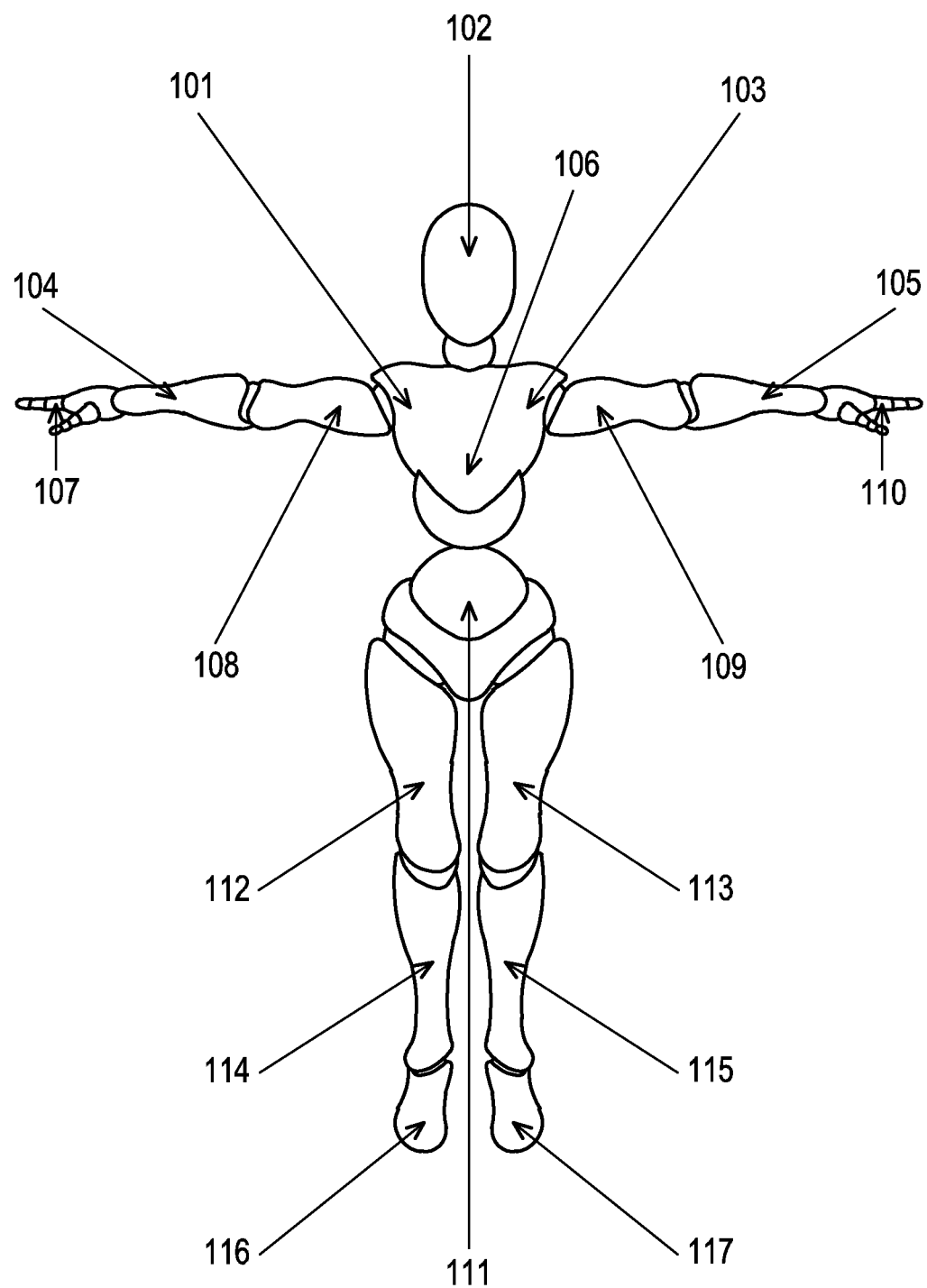
FIG. 1 is a schematic diagram of a virtual avatar model in an embodiment of the disclosure.

Some embodiments of the disclosure accompanied with the drawings will now be described in detail. For the reference numerals recited in description below, the same reference numerals shown in different drawings will be regarded as the same or similar elements. These embodiments are only a part of the disclosure, and do not disclose all the possible implementations of the disclosure. To be more precise, these embodiments are only examples of the appended claims of the disclosure. Wherever possible, elements/components/steps with the same reference numerals in the drawings and embodiments represent the same or similar parts. Cross-reference may be made between the elements/components/steps in different embodiments that are denoted by the same reference numerals or that have the same names.

FIG. 1 is a schematic diagram of a virtual avatar model in an embodiment of the disclosure. In a scenario of virtual reality, a user operates the movements of a virtual avatar model 10 through a human-machine interface (HMI). For example, the human-machine interface may be equipped with multiple wearable devices on multiple body parts operated by the user, and the wearable devices sense the motion features of the multiple body parts of the user. The human-machine interaction interface analyzes, recognizes, determines or transforms the collected motion features, and presents the movements operated by the user on the virtual avatar model 10. The avatar model 10 includes a plurality of nodes. The nodes of the virtual avatar model 10 correspond to the body parts of the user. In one embodiment, the virtual avatar model 10 may be divided into a plurality of body parts corresponding to the movements of the user, such as a hand part, a head part, a central part, and a foot part. In one embodiment, each body part includes at least one node.

For example, in FIG. 1, the virtual avatar model 10 includes a right shoulder node 101 (which may be represented by the label "rightShoulder"), a head node 102 (which may be represented by the label "head"), a left shoulder node 103 (which may be represented by the label "leftShoulder"), a right lower arm node 104 (which may be represented by the label "rightLowerArm"), a left lower arm node 105 (which may be represented by the label "leftLowerArm"), a body node 106 (which may be represented by the label "body"), a right hand node 107 (which may be represented by the label "rightHand"), a right upper arm node 108 (which may be represented by the label "rightUpperArm"), a left upper arm node 109 (which may be represented by label "leftUpperArm"), a left hand node 110 (which may be represented by the label "leftHand"), a hip node 111 (which may be represented by the label "leftHand"), a right upper leg node 112 (which may be represented by the label "rightUpLeg"), left upper leg node 113 (which may be represented by the label "leftUpLeg"), a right lower leg node 114 (which may be represented by the label "rightLowerLeg"), a left lower leg node 115 (which may be represented by the label "leftLowerLeg"), a right foot node 116 (which may be represented by the label "rightFoot"), and a left foot node 117 (which may be represented by the label "leftFoot").

In one embodiment, the right hand node 107, the right lower arm node 104, the right upper arm node 108, the left hand node 110, the left lower arm node 105 and the left upper arm node 109 belong to the hand part of the virtual avatar model 10.

In one embodiment, the head node 102 of the virtual avatar model 10 belongs to the head part of the virtual avatar model 10.

In one embodiment, the right shoulder node 101, the left shoulder node 103, the body node 106 and the hip node 111 belong to the central part of the virtual avatar model 10.

In one embodiment, the right foot node 116, the right lower leg node 114, the right upper leg node 112, the left foot node 117, the left lower leg node 115 and the left upper leg node 113 belong to the foot part of the virtual avatar model 10.

Figure 2:
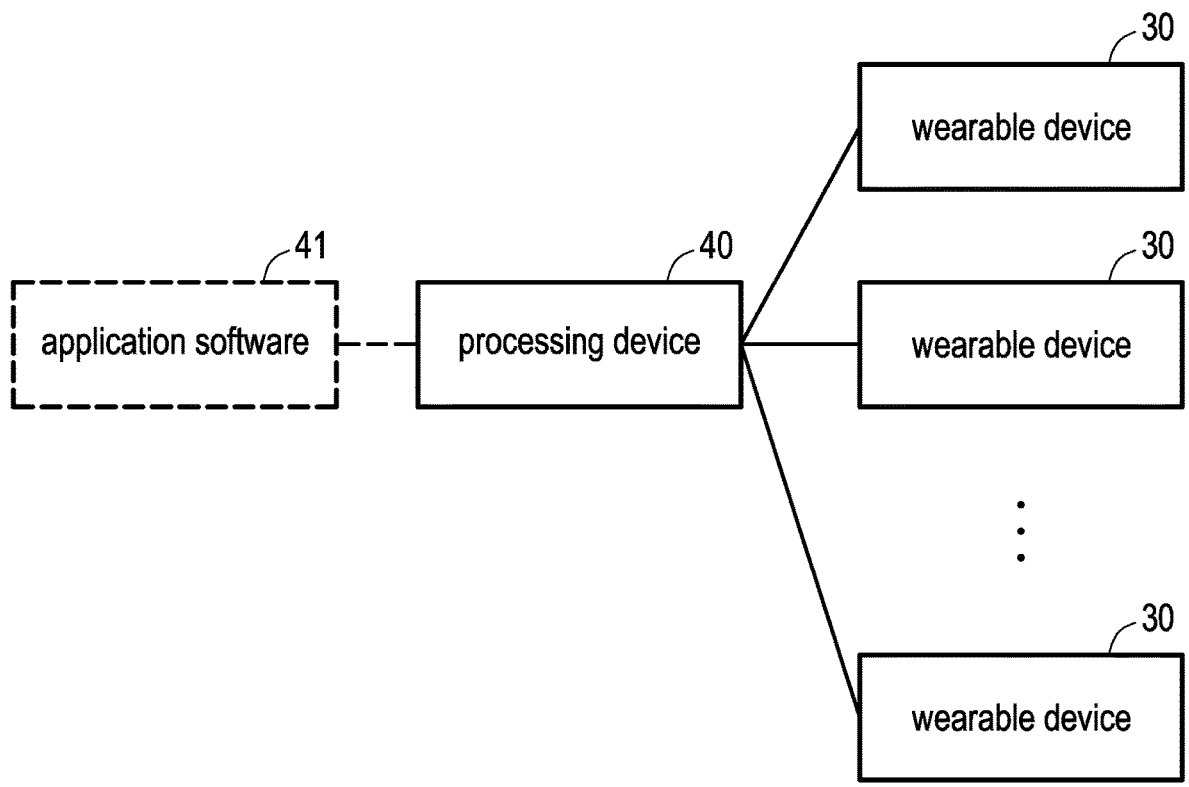
FIG. 2 is a schematic diagram of a wireless motion capturing system according to an embodiment of the disclosure.

FIG. 2 is a schematic diagram of a wireless motion capturing system according to an embodiment of the disclosure. The human-machine interface is, for example, a wireless motion capturing system 20 for capturing the movements of the user operating the virtual avatar model 10. The wireless motion capturing system 20 includes a plurality of wearable devices 30 and a processing device 40. The plurality of wearable devices 30 communicate with the processing device 40. The plurality of wearable devices 30 sense the movement of the body parts worn by the user to generate sensor data. The processing device 40 receives the sensor data. The sensor data is associated with the motion feature of the body part of the wearing position of the wearable device 30. The motion features correspond to multiple nodes of the virtual avatar model 10. The processing device 40 analyzes the sensor data and identifies the wearable devices 30 as at least one of the nodes.

Figure 3:
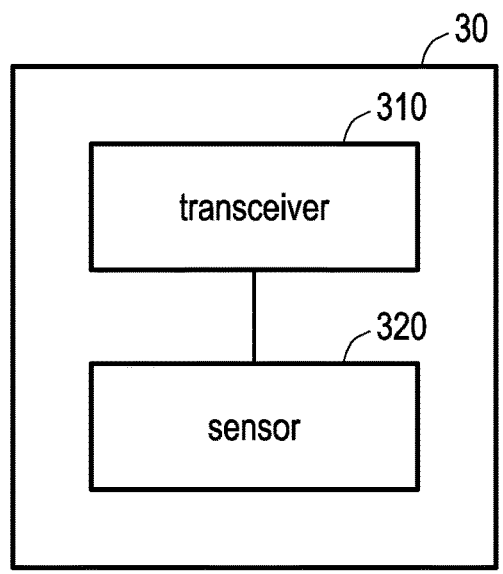
FIG. 3 is a schematic diagram of a wearable device according to an embodiment of the disclosure.

FIG. 3 is a schematic diagram of a wearable device 30 according to an embodiment of the disclosure. The wearable device 30 includes a transceiver 310 and a sensor 320. The transceiver 310 is coupled to the sensor 320. Concretely, the sensor 320 may include an accelerometer, a gyroscope and/or a magnetometer. The sensor 320 may sense accelerometer signals, gyroscope signals and/or magnetometer signals in the directions of three orthogonal coordinate axes (x-axis, y-axis and z-axis) of the wearable device 30 in space. The sensor 320 is, for example, a nine-degree of freedom inertial measurement unit (9D IMU). The sensor 320 senses and collects accelerometer signals, gyroscope signals, gyroscope signal variations, and/or magnetometer signals in directions of three orthogonal coordinate axes in space. The wearable device 30 is disposed on a body part of the user. The wearable device 30 may sense the movement of the body part to generate sensor data. The wearable device 30 transmits the sensor data to the processing device 40 through the transceiver 310 for calculation so that the virtual avatar model 10 presents the same movements as operated by the user.

Figure 4:
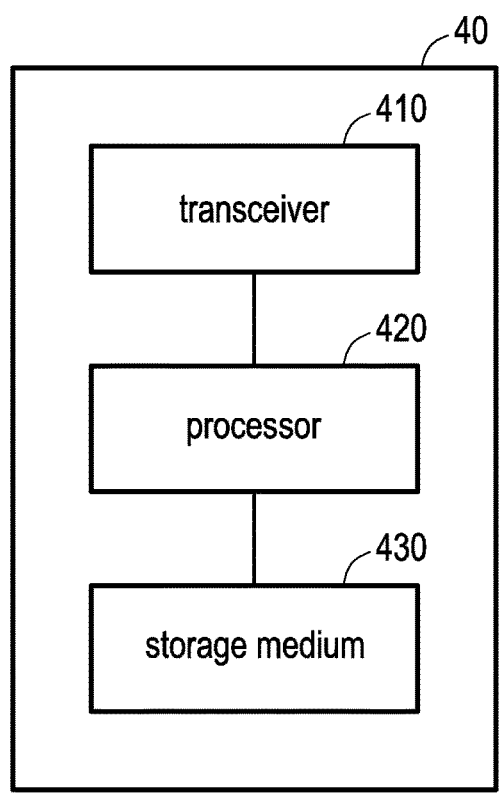
FIG. 4 is a schematic diagram of a processing device according to an embodiment of the disclosure.

FIG. 4 is a schematic diagram of a processing device according to an embodiment of the disclosure. The processing device 40 includes a transceiver 410, a processor 420 and a storage medium 430. The processor 420 is coupled to the transceiver 410 and the storage medium 430. In one embodiment, the processor 420 receives the sensor data through the transceiver 410 and stores the sensor data in the storage medium 430. The processor 420 analyzes the sensor data and identifies at least one of the plurality of nodes of the virtual avatar model 10 corresponding to each of the wearable devices 30.

In one embodiment, the processing device 40 may be a server, a client, a desktop computer, a notebook computer, a network computer, a workstation, a personal digital assistant, a personal computer, a tablet computer, a scanner, a telephone device, a smart phone, cameras, televisions, handheld game consoles, music devices, or wireless receivers. In one embodiment, the processing device 40 may be a dongle with Bluetooth, WiFi, and/or mobile communication functions.

Referring to FIG. 2, in an embodiment, the processing device 40 may include application software 41, and the application software 41 performs calculation on the sensor data. The application software 41 may be installed on a computing device other than the processing device 40. For example, the application software 41 may be installed on servers, clients, desktop computers, notebook computers, network computers, workstations, personal digital assistants, personal computers, tablet computers, scanners, telephone devices, smart phones, cameras, televisions, handheld game consoles, music devices, or wireless receivers, etc. In one embodiment, the processing device 40 transmits the collected sensor data to a device provided with the application software 41 through the transceiver 410, and the device executes calculation on the sensor data.

The transceivers 310 and 410 wirelessly transmit downlink signals and receive uplink signals. The transceivers 310 and 410 may be configured to transmit and receive signals at radio frequencies or at millimeter wave frequencies. The transceivers 310 and 410 may also perform operations such as low noise amplification, impedance matching, frequency mixing, up or down frequency conversion, filtering, amplification, and the like. The transceivers 310 and 410 may include one or more analog-to-digital (A/D) converters and digital-to-analog (D/A) converters. The converters are configured to convert from an analog signal format to a digital signal format during uplink signal processing, and to convert from a digital signal format to an analog signal format during downlink signal processing. The transceivers 310 and 410 may further include an antenna array, which may include one or more antennas for transmitting and receiving omnidirectional antenna beams or directional antenna beams. The transceivers 310 and 410 may include a WiFi communication interface, a Bluetooth communication interface, a ZigBee communication interface, a mobile communication interface and/or other wireless communication interfaces.

The processor 420 is configured for the whole or part of the operations of the processing device 40. In one embodiment, the processor 420 is a central processing unit (CPU), or other programmable general purpose or special purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable logic gate array (FPGA) or other similar components or a combination of the above components.

The storage medium 430 may store computer programs. In one embodiment, the storage medium 430 is any type of fixed or removable random access memory (RAM), read-only memory (ROM), flash memory, hard disk drive (HDD), solid state drive (SSD) or similar components or a combination of the above components. The storage medium 430 may store multiple modules, computer programs or various application programs executable by the processor 420.

Figure 5:
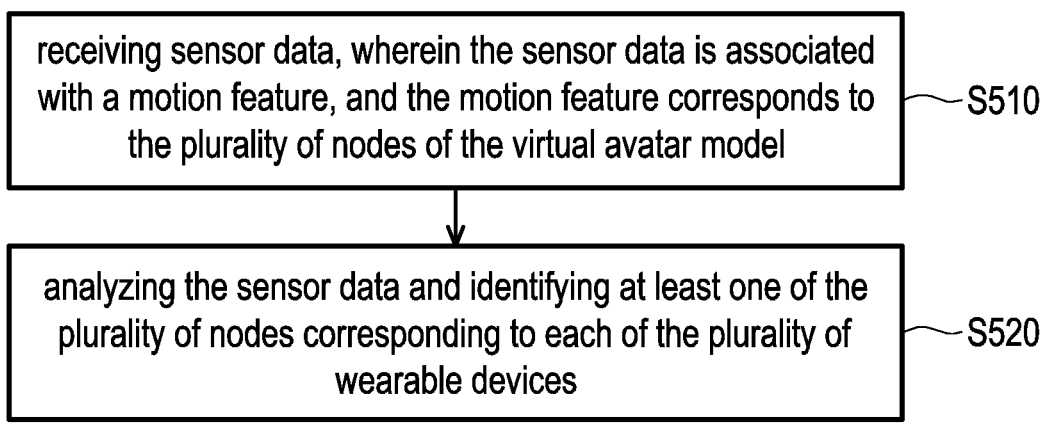
FIG. 5 is a flowchart of an identification method according to an embodiment of the disclosure.

FIG. 5 is a flowchart of an identification method according to an embodiment of the disclosure. The identification method in FIG. 5 is applicable to the wireless motion capturing system 20 with multiple wearable devices 30 shown in FIG. 2 to capture the movements of the user operating the virtual avatar model 10. In step S510, the processing device 40 receives sensor data, wherein the sensor data is associated with a motion feature, and the motion feature corresponds to a plurality of nodes of the virtual avatar model 10. The sensor data is, for example, the sensor data generated by the wearable device 30 sensing the movement of the user's body parts. In step S520, the processing device 40 analyzes the sensor data and identifies the wearable devices 30 as at least one of the nodes of the virtual avatar model 10.

In one embodiment, the virtual avatar model 10 includes at least one hand node, at least one head node, at least one central part node and at least one foot node.

In an embodiment, an identification method according to an embodiment of the disclosure may include the following steps: a plurality of wearable devices 30 generate first sensor data in response to a hand movement; the wearable devices 30 transmit the first sensor data to the processing device 40; the processing device 40 analyzes the first sensor data and identifies the plurality of wearable devices 30 as the at least one hand node, wherein the first sensor data is associated with a first motion feature, and the first motion feature corresponds to the at least one hand node of the virtual avatar model 10. In one embodiment, the at least one hand node includes one of the right hand node 107, the right lower arm node 104, the right upper arm node 108, the left hand node 110, the left lower arm node 105 and the left upper arm node 109 of the virtual avatar model 10. In an embodiment, the identification method may include: the processing device 40 receives the first sensor data according to a first prompt message, wherein the first prompt message instructs the user to perform a hand movement associated with the first motion feature.

In an embodiment, an identification method according to an embodiment of the disclosure may include the following steps: multiple wearable devices 30 generate second sensor data in response to a head movement; the plurality of wearable devices 30 transmit the second sensor data to the processing device 40; the processing device 40 analyzes the second sensor data and identifies the plurality of wearable devices 30 as the at least one head node, wherein the second sensor data is associated with a second motion feature, and the second motion feature corresponds to the at least one head node of the virtual avatar model 10. In one embodiment, the at least one head node is the head node 102 of the virtual avatar model 10. In an embodiment, the identification method may include: the processing device 40 receives the second sensor data according to a second prompt message, wherein the second prompt message instructs the user to perform a head movement associated with the second motion feature.

In an embodiment, an identification method according to an embodiment of the disclosure may include the following steps: a plurality of wearable devices 30 generate third sensor data in response to hand movement. The wearable devices 30 transmit the third sensor data to the processing device 40. The processing device 40 analyzes the third sensor data and identifies a plurality of wearable devices 30 as the at least one central node, wherein the third sensor data is associated with a third motion feature, and the third motion feature corresponds to the at least one central part node of the virtual avatar model 10. In one embodiment, the at least one central part node includes one of the right shoulder node 101, the left shoulder node 103, the body node 106 and the hip node 111 of the virtual avatar model 10. In an embodiment, the identification method may include: the processing device 40 receives the third sensor data according to a third prompt message, wherein the third prompt message instructs the user to perform a central part movement associated with the third motion feature.

In an embodiment, an identification method according to an embodiment of the disclosure may include the following steps: a plurality of wearable devices 30 generate fourth sensor data in response to a foot movement; the wearable devices 30 transmit the fourth sensor data to the processing device 40; the processing device 40 analyzes the fourth sensor data and identifies the plurality of wearable devices 30 as the at least one foot node, wherein the fourth sensor data is associated with a fourth motion feature, and the fourth motion feature corresponds to the at least one foot node of the virtual avatar model 10. In one embodiment, the at least one foot node includes one of the right foot node 116, the right lower leg node 114, the right upper leg node 112, the left upper leg node 113, the left foot node 117, the left lower leg node 115 and the left foot node of the virtual avatar model 10. In an embodiment, the identification method may include: the processing device 40 receives the fourth sensor data according to a fourth prompt message, wherein the fourth prompt message instructs the user to perform a foot movement associated with the fourth motion feature.

Figure 6:
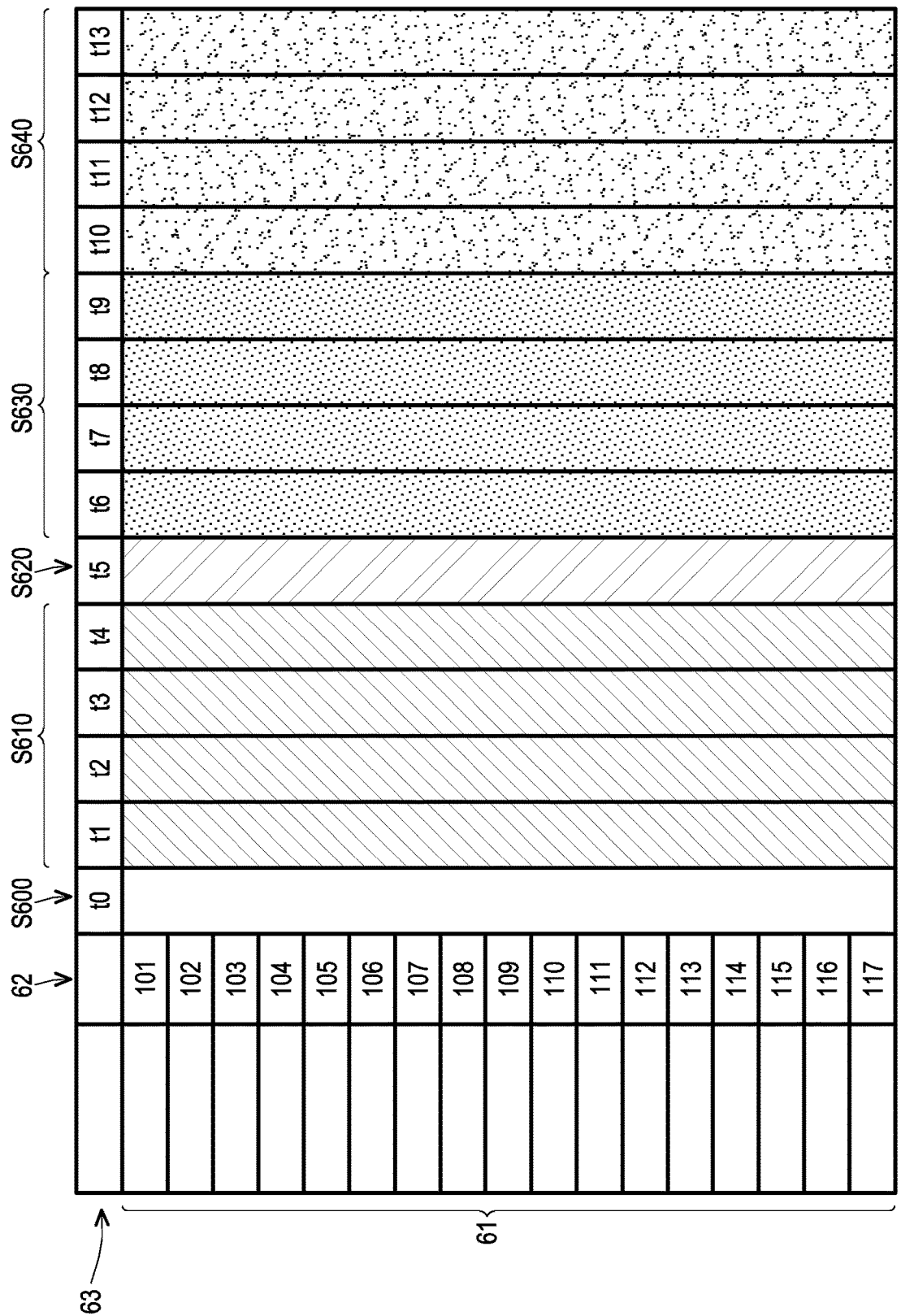
FIG. 6 is a schematic diagram of sequentially identifying multiple nodes of an avatar model in an embodiment of the disclosure.

FIG. 6 is a schematic diagram of sequentially identifying nodes of the virtual avatar model 10 in an embodiment of the disclosure. Table 60 presents a process in which multiple wearable devices 30 are sequentially identified as the nodes of the virtual avatar model 10. The vertical entries in the column 61 are labels corresponding to the correct wearing positions of the nodes of the virtual avatar model 10. The vertical entries in column 62 are identification codes of the wearable devices 30. Multiple fields in row 63 indicate multiple stages of time points. The stages include an initial stage S600, a stage S610 of identifying hand nodes, a stage S620 of identifying head nodes, a stage S630 of identifying central part nodes, and a stage S640 of identifying foot nodes. Among the columns of each stage, the marked fields indicate the tag of the wearable device 30 as identified at that time instance.

The initial phase S600 begins at time t0. After the user wears the wearable devices 30, the user waits for the identification process of the nodes of the virtual avatar model 10 in a preparatory pose according to a prompt message.

In the stage S610 of identifying hand nodes at time t1, t2, t3, and t4, distinction between left hand and right hand, identification of hand nodes, lower arm nodes, and upper arm nodes will be performed. At time t1, the left hand node and the right hand node of hand nodes are distinguished first. At this point, nodes 104, 107, and 108 are successfully identified as right hand nodes, and nodes 105, 109, and 110 are successfully identified as left hand nodes. At time t2, the hand node is identified. At this time, node 107 among the right hand nodes is identified as the right hand node and marked with a corresponding label "rightHand", and node 110 among the left hand nodes will be identified as the left hand node and marked with a corresponding label "leftHand". At time t3, the lower arm node is identified. At this time, the node 104 among the right hand nodes is identified as the lower arm node and marked with the corresponding label "rightLowerArm", and the node 105 among the left hand nodes is identified as the lower arm node and marked with the corresponding label "leftLowerArm". At time t4, the upper arm node is identified. At this time, the node 108 among the right hand nodes is identified as the upper arm node and marked with the corresponding label "rightUpperArm", and the node 109 among the left hand nodes will be identified as the upper arm node and marked with the corresponding label "leftUpperArm".

In the stage S620 of identifying the head node, the head node is identified at time t5. At this time, the node 102 will be successfully identified as the head node and marked with the corresponding label "head".

In the stage S630 of identifying the central part node, identification of the right shoulder node, the left shoulder node, the hip node, and the body node will be respectively performed at times t6, t7, t8, and t9. At time t6, the right shoulder node is identified. At this time, the node 101 is identified as the right shoulder node and marked with the corresponding label "rightShoulder". At time t7, the left shoulder node is identified. At this point, the node 103 is identified as the left shoulder node and marked with the corresponding label "leftShoulder". At time t8, the hip node is identified. At this time, node 111 is identified as a hip node and marked with the corresponding label "hip". At time t9, a body node is identified. At this time, the node 106 is identified as a body node and marked with a corresponding label "body".

In the step S640 of identifying foot nodes, distinction between left foot and right foot, identification of foot nodes, lower leg nodes, and upper leg nodes will be performed respectively at time t10, t11, t12, and t13. At time t10, the left foot and right foot are distinguished. In one embodiment, the left foot node may be identified first and then the right foot node may be identified later. At this point, nodes 112, 114, and 116 are identified as left foot nodes, and the remaining nodes 113, 115, and 117 are identified as right foot nodes.

In an alternative embodiment, the right foot node may be identified first and then the left foot node may be identified later instead. At this point, nodes 113, 115, and 117 are identified as right foot nodes, and the remaining nodes 112, 114, and 116 are identified as left foot nodes. Next, at time t11, t12, and t13, the foot node, lower leg node, and upper leg node of the same foot are sequentially identified. The identification of nodes belong to the left foot and the right foot may be performed at the same time.

Therefore, at time t13, the foot nodes, lower leg nodes, and upper leg nodes of the left foot and the right foot are successfully identified respectively. Nodes 112, 114, and 116 are marked with corresponding labels "rightUpLeg", "right-LowerLeg", and "rightFoot" respectively. Nodes 113, 115, and 117 are marked with corresponding labels "leftUpLeg", "leftLowerLeg" and "leftFoot" respectively.

It is worth noting that the sequential order of the stage S610 of identifying the hand node, the stage S620 of identifying the head node, the stage S630 of identifying the central part node, and the stage S640 of identifying the foot node may be arranged differently and adjusted in any order arbitrarily, and the stages are not limited to be performed in the order of stage S610, S620, S630, and S640.

[Stage S610 of Identifying Hand Nodes]

Figure 7:
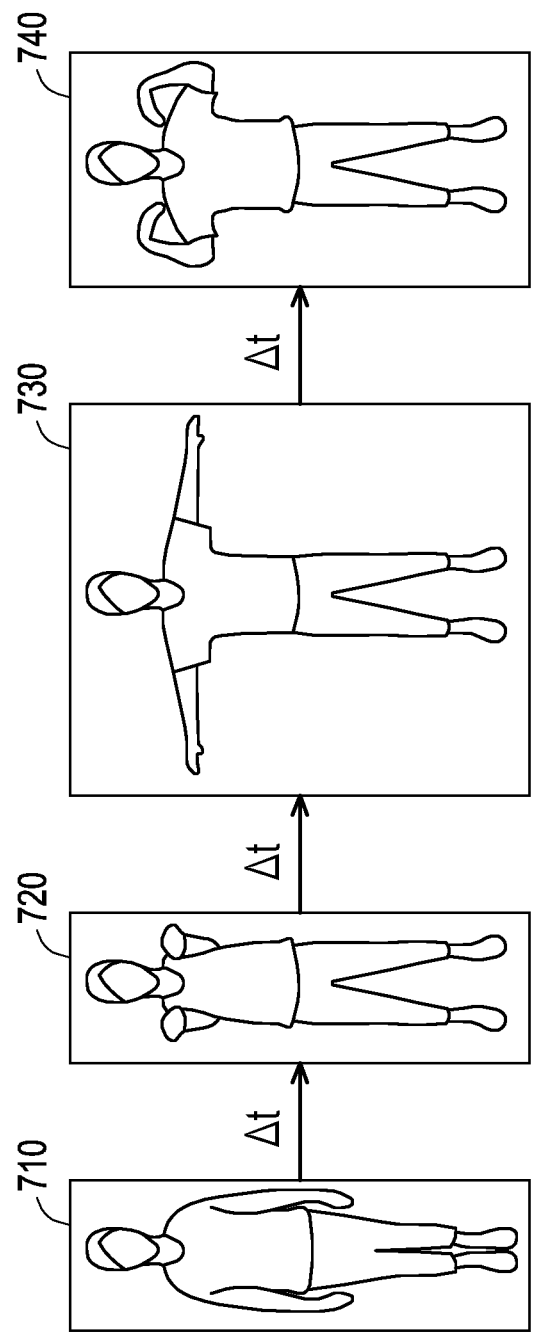
FIG. 7 is a schematic diagram of identifying hand nodes in an embodiment of the disclosure.
Figure 7:
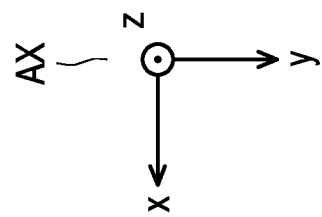

FIG. 7 is a schematic diagram of identifying hand nodes in an embodiment of the disclosure. Please refer to FIG. 7, the user wears wearable devices 30 and performs different poses for identification of the hand nodes corresponding to the wearable devices 30 according to a prompt message. As shown in FIG. 7, in an embodiment, the poses indicated by the prompt message include a standing pose 710, an L pose 720, a T pose 730 and a shoulder-touching pose 740. In FIG. 7, the orientation of the sensors of each wearable device 30 is shown on the coordinate AX. The positive direction of the x-axis points to the left, the positive direction of the y-axis points downward, and the positive direction of the z-axis is the direction out of the paper.

The user first prepares in the standing pose 710. When the process of identifying the hand nodes starts, the user performs and maintains the L pose 720 within a predetermined time Δt according to the prompt message. In one embodiment, the predetermined time Δt is set to "5 seconds". The specific value of the predetermined time Δt may be adjusted correspondingly according to different applications. For example, the specific value of the predetermined time Δt may be adaptively adjusted in consideration of the user's physiological information, physical condition and/or exercise ability, and so on. If it is expected that the user's movement may be slow, a larger predetermined time Δt may be set to allow the user to have sufficient time to perform the movement indicated by the prompt message.

Then, the user changes the pose from the L pose 720 to the T pose 730 within a predetermined time Δt according to the prompt message. At this time, the sensors of the plurality of wearable devices 30 generate the first pose signal in response to the movement of changing from the L pose 720 to the T pose 730. The first pose signal may include motion features associated with the user's hand movement. The plurality of wearable devices 30 transmit the sensor data including the first pose signal to the processing device 40.

Next, the user changes the pose from the T pose 730 to the shoulder touching pose 740 within a predetermined time Δt according to the prompt message. At this time, the sensors of the plurality of wearable devices 30 generate the second pose signal in response to the movement of changing from the T pose 730 to the shoulder touching pose 740. The second pose signal may include motion features associated with the user's hand movement. The plurality of wearable devices 30 transmit the sensor data including the second pose signal to the processing device 40. Subsequently, the processing device 40 analyzes the sensor data and identifies the at least one hand node respectively corresponding to the wearable devices 30.

Figure 8:
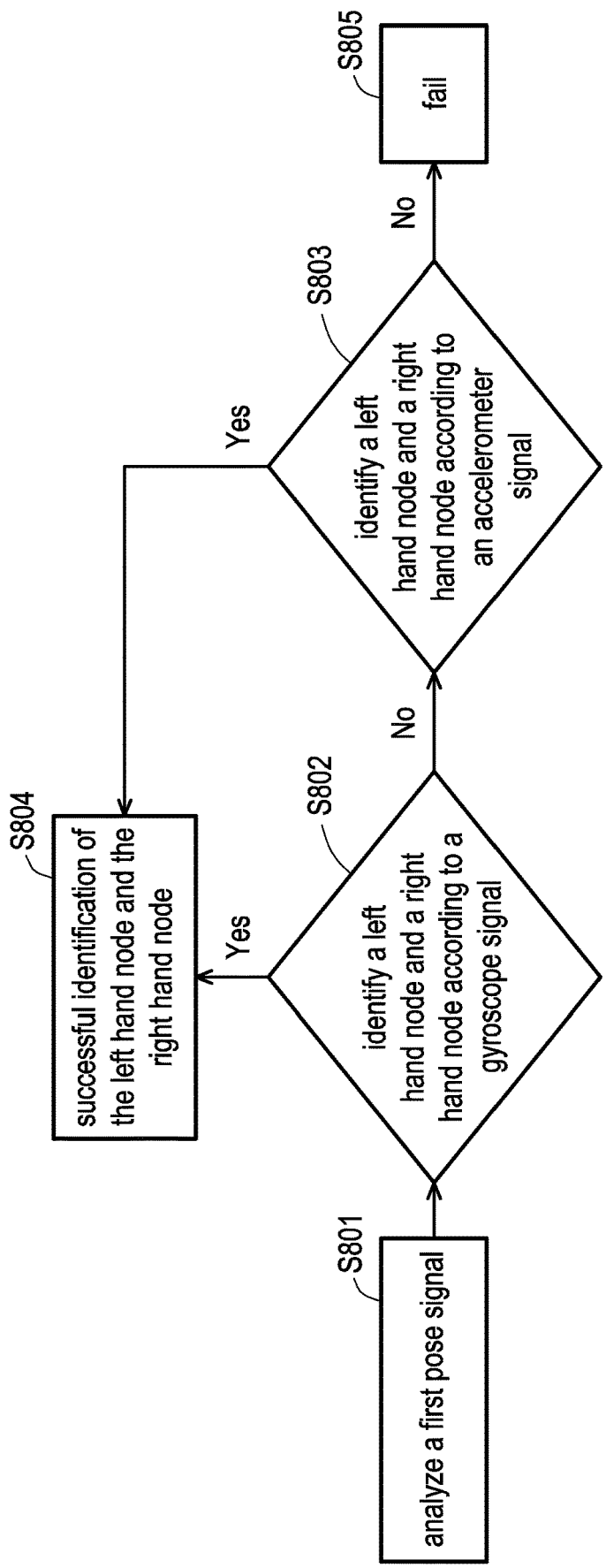
FIG. 8 is a flowchart of identifying left hand nodes and right hand nodes in an embodiment of the disclosure.

FIG. 8 is a flowchart of identifying left hand nodes and right hand nodes in an embodiment of the disclosure. In step S801, the first pose signal is analyzed. Specifically, the first pose signal may include a gyroscope signal and/or an accelerometer signal generated corresponding to the movement of changing from the L pose 720 to the T pose 730.

In step S802, the left hand node and the right hand node are identified according to the gyroscope signal. In one embodiment, the step of analyzing the sensor data and identifying a plurality of wearable devices 30 respectively corresponding to at least one of the nodes includes: collecting a gyroscope signal accumulation value, a gyroscope signal maximum value, and a gyroscope signal minimum value from that first pose signal; in response to the gyroscope signal accumulation value being greater than a first threshold and the gyroscope signal maximum being greater than a signal threshold, determining the wearable devices as the at least one left hand node; and in response to the gyroscope signal accumulation value being greater than the first threshold and the absolute value of the gyroscope signal minimum value being greater than the signal threshold, determining the wearable devices as the at least one right hand node.

In one embodiment, in step S802, the following formulas (1-1), (1-2), (1-3) are used for calculation and determination:

$$S_i = \sum_{T_1}^{T_2} G_{pi} \qquad (1\text{-}1)$$

$$(|S_i| > Th_H) \,\&\, \left(\text{Max}(G_{piT1} \sim G_{piT2}) > Th_{RL}\right) \qquad (1\text{-}2)$$

$$(|S_i| > Th_H) \,\&\, \left(|\text{Min}(G_{piT1} \sim G_{piT2})| > Th_{RL}\right) \qquad (1\text{-}3)$$

The variable $S_i$ represents the gyroscope signal accumulation value. p is the directions of x, y, and z axes, and p may be different according to the preset placement directions of the wearable device 30. i is the identification number of the wearable device 30. T1 is the start time of the movement of changing from the L pose 720 to the T pose 730. T2 is the end time of the movement of changing from the L pose 720 to the T pose 730. $G_{p\,i}$ indicates the gyroscope signal. $Th_H$ is the first threshold. $Th_{RL}$ is the signal threshold. Max($G_{p\,i\,T1}$–$G_{p\,i\,T2}$) refers to getting the maximum value of the gyroscope signal. |Min($G_{p\,i\,T1}$~$G_{p\,i\,T2}$)| refers to getting the absolute value of the minimum value of the gyroscope signal.

In one embodiment, the value $Th_H$ of the first threshold value of formula (1-2) and formula (1-3) ranges from "1219.5" to "6097.5", and the unit of the first threshold value $Th_H$ is gram (g).

In one embodiment, the value of the signal threshold value $Th_{RL}$ of formula (1-2) and formula (1-3) ranges from "60.9" to "121.9", and the unit of the signal threshold value $Th_{RL}$ is degrees per second (dps).

In formula (1-1), the accumulation value of gyroscope signals of each wearable device 30 during the movement from the L pose 720 to the T pose 730 is collected. Specifically, during the movement of the user changing from the L pose 720 to the T pose 730, multiple wearable devices 30 located in different positions may generate different gyroscope signal variations in different directions. The formula (1-1) accumulates the gyroscope signal $G_{p\,i}$ over a period of time, so that the noise in different directions may be canceled out. Then in the formulas (1-2) and (1-3), it is determined whether the node is the left hand node or the right hand node using the absolute value of the accumulation value $S_i$, the absolute value of the maximum value of the gyroscope signal, and the absolute value of the minimum value of the gyroscope signal.

If the calculation result of the formula (1-2) is true, it is determined that a node is a left hand node.

If the calculation result of the formula (1-3) is true, it is determined that a node is a right hand node.

Figure 11:
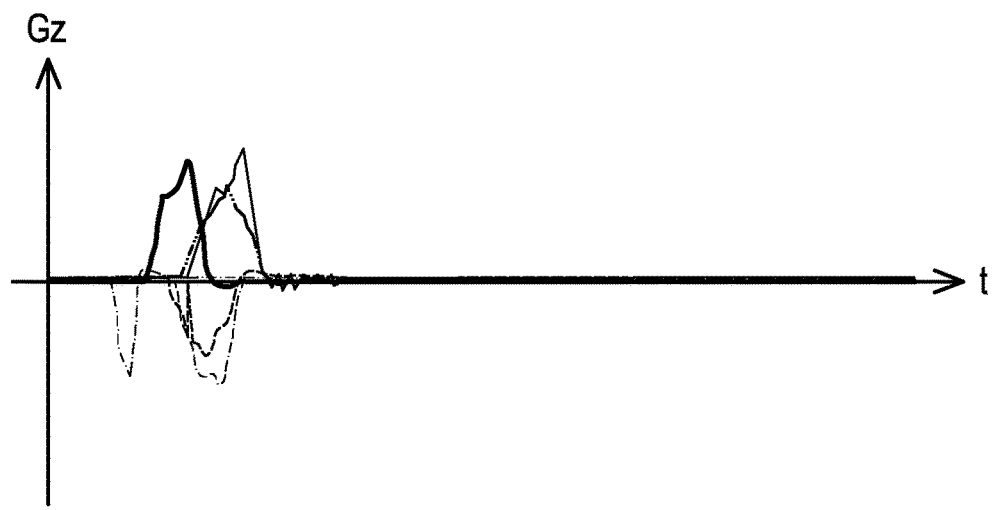
FIG. 11 is an example of a first pose signal in an embodiment of the disclosure.

In the process of changing from the L pose 720 into the T pose 730, the direction of the gyroscope signal generated by a wearable device 30 on the left hand is opposite to the direction of the gyroscope signal generated by a wearable device 30 on the right hand. Specifically, taking the gyroscope signal in the z-axis direction as an example, the wearable device 30 on the left hand generates a maximum value of the gyroscope signal in the positive direction of the z-axis, while the wearable device 30 on the right hand generates a minimum value of gyroscope signal in the negative direction of the z-axis. In detail, the motion features of the first pose signal are shown in FIG. 11. The left hand node and the right hand node may be determined through formulas (1-1), (1-2), (1-3) based on the difference of the motion features.

If the left hand node or the right hand node can be identified in step S802, then it is determined in step S804 that the result indicates the left hand node or the right hand node has been successfully identified. If the identification in step S802 cannot distinguish the left hand node from the right hand node, then the process goes to step S803.

The above step S802 is to identify the left hand node or the right hand node using the motion feature of the gyroscope signal. On the other hand, the motion feature of the accelerometer signal may also be used to identify the left hand node or the right hand node.

In step S803, the left hand node and the right hand node are identified according to the accelerometer signal. In one embodiment, the step of analyzing the sensor data and identifying a plurality of wearable devices 30 respectively corresponding to at least one of the nodes includes: collecting an accelerometer signal maximum value and an accelerometer signal minimum value from the first pose signal; recording a first timestamp corresponding to the accelerometer signal maximum value and a second timestamp corresponding to the accelerometer signal minimum value; in response to the first timestamp being less than the second timestamp and both the accelerometer signal maximum value and an absolute value of the accelerometer signal minimum value being greater than a signal threshold, determining the wearable devices 30 as the at least one right hand node; and in response to the first timestamp being greater than the second timestamp and both the accelerometer signal maximum value and the absolute value of the accelerometer signal minimum value being greater than the signal threshold, determining the wearable devices 30 as the at least one left hand node.

In one embodiment, in step S803, the following formulas (2-1), (2-2), (2-3), (2-4), (2-5), (2-6) are used for calculation and determination:

$$V_{iMAX} = \text{Max}(A_{p\ i\ T1} \sim A_{p\ i\ T2}) \quad (2\text{-}1)$$

$$V_{iMIN} = \text{Min}(A_{p\ i\ T1} \sim A_{p\ i\ T2}) \quad (2\text{-}2)$$

-continued $$T_{iMAX} = TS(V_{iMAX}) \quad (2\text{-}3)$$

$$T_{iMIN} = TS(V_{iMIN}) \quad (2\text{-}4)$$

$$(T_{iMAX} > T_{iMIN}) \,\&\, (|V_{iMIN}| > Th_H) \,\&\, (V_{iMAX} > Th_H) \quad (2\text{-}5)$$

$$(T_{iMAX} < T_{iMIN}) \,\&\, (|V_{iMIN}| > Th_H) \,\&\, (V_{iMAX} > Th_H) \quad (2\text{-}6)$$

$A_{p\ i}$ indicates the accelerometer signal. The variable $V_{iMAX}$ represents the maximum value of the accelerometer signal. The variable $V_{iMIN}$ represents the accelerometer signal minimum value. i is identification number of the wearable device 30. T1 is the start time of the movement of changing from the L pose 720 into the T pose 730. T2 is the end time of the movement of changing from the L pose 720 into the T pose 730. p is the directions of x, y, and z axes, and may be different for preset placement directions of the wearable device 30. $T_{iMAX}$ indicates the first timestamp corresponding to the maximum value of the accelerometer signal. $T_{iMIN}$ indicates the second timestamp corresponding to the minimum value of the accelerometer signal. $Th_H$ is the signal threshold.

In one embodiment, the value of the signal threshold $Th_H$ in formula (2-5) and formula (2-6) is "0.0488 (g)".

In formula (2-1), $\text{Max}(A_{p\ i\ T1} \sim A_{p\ i\ T2})$ refers to taking the maximum value of the accelerometer signal each wearable device 30 during the movement from the L pose 720 to the T pose 730.

In formula (2-2), $\text{Min}(A_{p\ i\ T1} \sim A_{p\ i\ T2})$ refers to taking the minimum value of the accelerometer signal each wearable device 30 during the movement from the L pose 720 to the T pose 730.

In formula (2-3), the variable $TS(V_{iMAX})$ records the first timestamp corresponding to the maximum value of the accelerometer signal $V_{iMAX}$ as $T_{iMAX}$.

In formula (2-4), the variable $TS(V_{iMIN})$ records the second timestamp corresponding to the minimum value of the accelerometer signal $V_{iMIN}$ as $T_{iMIN}$.

If the calculation result of the formula (2-5) is true, it is determined as a right hand node.

If the calculation result of the formula (2-6) is true, it is determined as a left hand node.

Specifically, during the movement of changing from the L pose 720 into the T pose 730, the direction of the accelerometer signal generated by the wearable device 30 on the left hand is opposite to that of the accelerometer signal generated by the wearable device 30 on the right hand.

In one embodiment, during the movement of changing from the L pose 720 to the T pose 730, taking the accelerometer signal in the x-axis direction as an example, the wearable device 30 on the left hand generates a maximum value of the accelerometer signal in the positive direction of the x-axis, and the minimum value is generated in the negative direction of the x-axis. In contrast, the wearable device 30 on the right hand generates the minimum value of the accelerometer signal in the negative direction of the x-axis, and then the maximum value of the accelerometer signal is generated in the positive direction of the x-axis. Therefore, the left hand node and the right hand node can be distinguished based on the difference in motion features.

If the left hand node and the right hand node can be identified in step S803, then it is determined in step S804 that the result indicates the left hand node or the right hand node has been successfully identified. If the identification in step S803 fails to distinguish the left hand node and the right hand node, then it is determined in step S805 that the identification fails. The user will be prompted to perform identification process again.

It should be noted that the order of the above step S802 and step S803 may be exchanged arbitrarily or executed separately. In an embodiment, step S803 may be executed first and then step S802 may be executed later. In an embodiment, step S802 may be performed independently. In an embodiment, step S803 may be performed independently.

Figure 9:
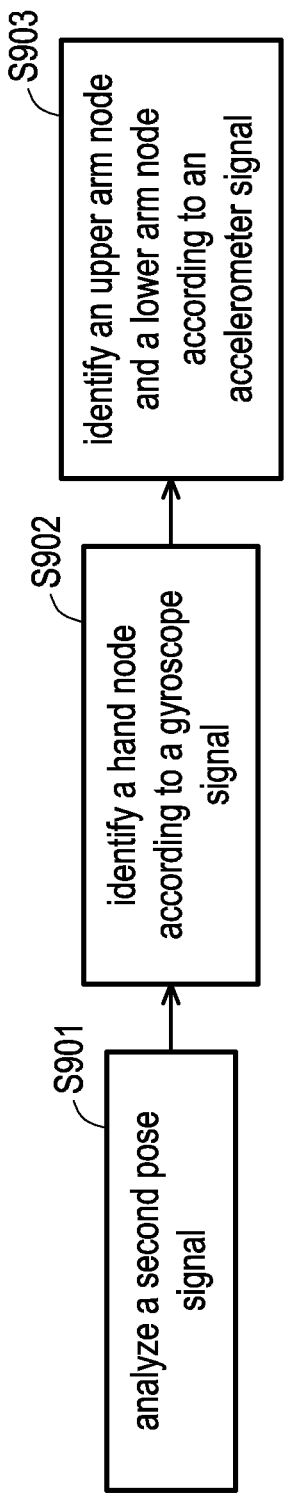
FIG. 9 is a flowchart of identifying hand nodes in an embodiment of the disclosure.

FIG. 9 is a flowchart of identifying hand nodes in an embodiment of the disclosure. In step S901, the second pose signal is analyzed. In step S902, the hand node is identified according to the gyroscope signal. In step S903, the upper arm node and the lower arm node are identified according to an accelerometer signal.

Figure 10:
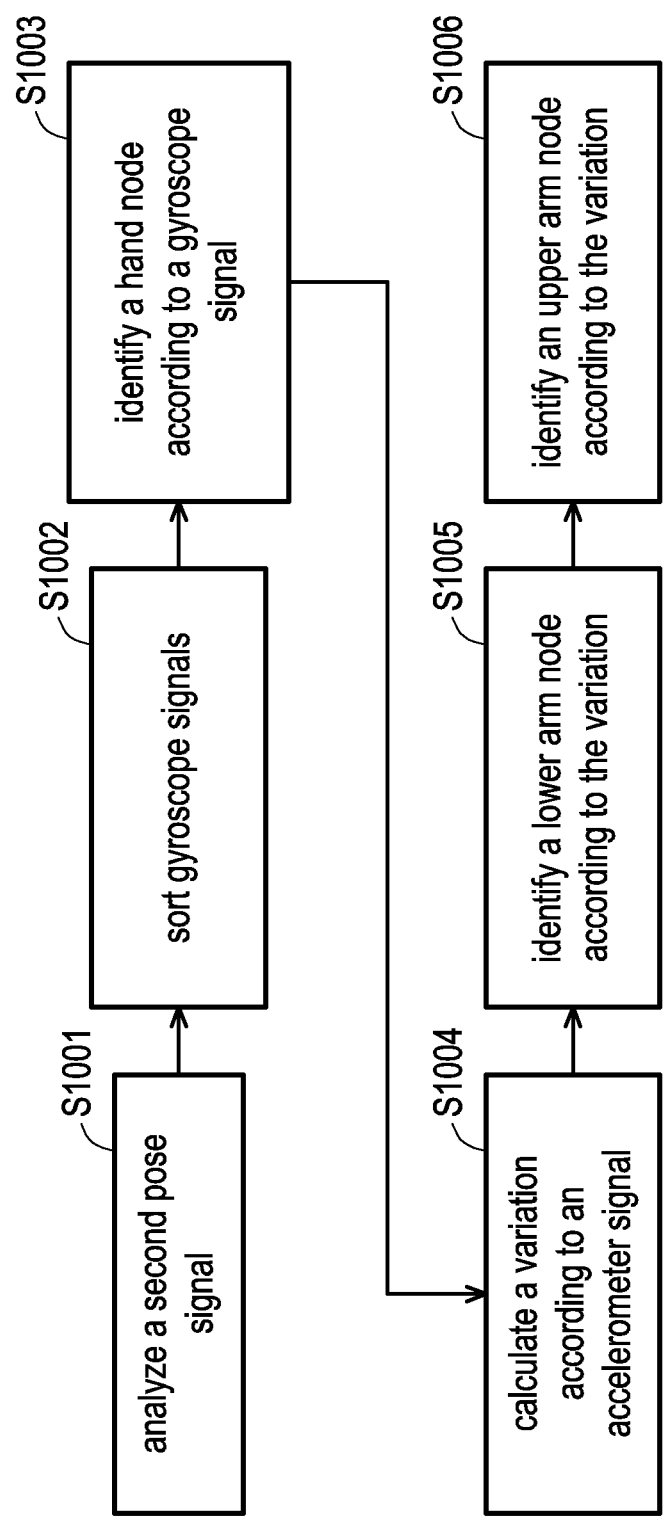
FIG. 10 is a flowchart of identifying a hand node, a lower arm node, and an upper arm node in an embodiment of the disclosure.

FIG. 10 is a flowchart of identifying a hand node, a lower arm node, and an upper arm node in an embodiment of the disclosure. In step S1001, the second pose signal is analyzed. Specifically, the second pose signal may include a gyroscope signal and/or an accelerometer signal generated corresponding to the movement of changing from the T pose 730 into the shoulder touching pose 740.

In step S1002, the gyroscope signals are sorted.

In step S1003, the hand node is identified according to the gyroscope signal. In one embodiment, the step of identifying the hand node includes: finding a gyroscope signal maximum value from the second pose signal; finding a wearable device 30 that corresponds to the gyroscope signal maximum value; and determining the wearable device 30 that corresponds to the gyroscope signal maximum value as the hand node.

In one embodiment, in step S1003, the following formulas (3-1), (3-2) are used for calculation and determination:

$$V_{iMAX} = \text{Max}(G_{p\ i\ T1} \sim G_{p\ i\ T2}) \quad (3\text{-}1)$$

$$D_{Hand} = \text{Argmax}_i(V_{iMAX}) \quad (3\text{-}2)$$

The variable $V_{iMAX}$ represents the maximum value of the gyroscope signal. i is the identification number of the wearable device 30. T1 is the start time of the movement of changing from the T pose 730 into the shoulder touching pose 740. T2 is the end time of the movement of changing from the T pose 730 to the shoulder-touching pose 740. p is the directions of x, y, and z axes, and p may be different according to the preset placement directions of the wearable device 30. The variable $D_{Hand}$ represents the identification number of the wearable device 30 identified as the hand node.

In the formula (3-1), $\text{Max}(G_{p\ i\ T1} - G_{p\ i\ T2})$ finds out the maximum value of the gyroscope signal during the movement from the T pose 730 to the shoulder-touching pose 740 among the hand devices on the same side.

In formula (3-2), $\text{Argmax}_i(V_{iMAX})$ finds out the wearable device 30 corresponding to the maximum value of the gyroscope signal $V_{iMAX}$ and the wearable device 30 is identified as the hand node.

In step S1004, a variation is calculated according to an accelerometer signal. In one embodiment, the step of calculating the variation includes: finding, from the second pose signal, an accelerometer signal maximum value and an accelerometer signal minimum value of the wearable devices excluding wearable devices that corresponds to the hand node; calculating a variation according to the accelerometer signal maximum value and the accelerometer signal minimum value. It should be noted that after the hand node has been identified in step S1003, the signal generated by the wearable device 30 corresponding to the hand node is excluded from the second pose signal. Next, the lower arm node and the upper arm node are determined according to the maximum value of the accelerometer signal and the minimum value of the accelerometer signal from the second pose signal excluding the hand node.

In one embodiment, in step S1004, the following formulas (4-1), (4-2), (4-3) are used for calculation:

$$V_{iMAX} = \text{Max}(A_{p\ i\ T1} \sim A_{p\ i\ T2}) \quad (4\text{-}1)$$

$$V_{iMIN} = \text{Min}(A_{p\ i\ T1} \sim A_{p\ i\ T2}) \quad (4\text{-}2)$$

$$VAR_i = ||V_{iMAX}| - |V_{iMIN}|| \quad (4\text{-}3)$$

The variable $V_{iMAX}$ represents the maximum value of the accelerometer signal. The variable $V_{iMIN}$ represents the accelerometer signal minimum value. $VAR_i$ indicates the variation. i is the identification number of the wearable device 30. T1 is the start time of the movement of changing from the T pose 730 into the shoulder-touching pose 740. T2 is the end time of the movement of changing from the T pose 730 to the shoulder-touching pose 740. p is the directions of x, y, and z axes, and p may be different according to the preset placement directions of the wearable device 30.

In step S1005, the lower arm node is identified according to the variation. In one embodiment, the step of identifying the node of the lower arm includes: finding a wearing device 30 corresponding to the variation from the plurality of wearing devices 30. It should be noted that, at this time, the signal generated by the wearable device 30 of the hand node has been excluded from the second pose signal. Therefore, in response to a wearable device 30 corresponding to the maximum value (first value) of the variation is not the hand node, it can be determined that the wearable device 30 corresponding to the maximum value (first value) of the variation is the lower arm node.

In one embodiment, the following formula (4-4) is used for determination in step S1005:

$$D_{LA} = \text{Argmax}_i\ (VAR_i)\ \&\ (D_{LA} \neq D_{Hand}) \quad (4\text{-}4)$$

The variable $D_{Hand}$ represents the identification number of the wearable device 30 identified as the hand node. The variable $D_{LA}$ represents the identification number of the wearable device 30 identified as the lower arm node.

In the formula (4-4), $\text{Argmax}_i(VAR_i)\ \&\ (D_{LA} \neq D_{Hand})$ is the formula for determination of the wearable devices 30 on the same hand. The formula (4-4) finds the maximum variation $VAR_i$ (i.e., the first value) in the wearable devices 30 on the same hand and determine whether the wearable device 30 is not a hand node. Then, it is determined that the wearable device 30 is the lower arm node.

In one embodiment, after the lower arm node has been identified in step S1005, the signal generated by the wearable device 30 corresponding to the lower arm node is excluded from the second pose signal. Next, identify the upper arm node in step S1006.

In step S1006, the upper arm node is identified according to the variation. In one embodiment, the step of identifying the node of the upper arm includes: finding a wearable device corresponding to a second value of the variation from the wearable devices; and in response to a wearable device 30 corresponding to the second value of the variation is not the hand node and not the lower arm node, it is determined that the wearable device 30 corresponding to the second value of the variation is the upper arm node.

In one embodiment, the following formula (4-5) is used for determination in step S1006:

$$D_{UA} = \text{Argmax}_i \ (VAR_i) \ \& \ (D_{UA} \neq D_{Hand}) \ \& \ (D_{UA} \neq D_{LA}) \quad (4\text{-}5)$$

The variable $D_{UA}$ represents the identification number of the wearable device 30 identified as the upper arm node.

In the formula (4-5), $\text{Argmax}_i \ (VAR_i) \& (D_{UA} \neq D_{Hand}) \& (D_{UA} \neq D_{LA})$ finds the maximum variation $VAR_i$ (i.e., the second value) in the wearable device 30 of the same hand and determines whether the wearable device 30 is neither a hand node nor a lower arm node. It should be noted that at this time, the signals generated by the wearable device 30 corresponding to the hand node and the lower arm node have been excluded from the second pose signal. Therefore, when a wearable device 30 satisfying the condition of formula (4-5) is found, it can be determined that the wearable device 30 is the upper arm node.

FIG. 11 is an example of a first pose signal in an embodiment of the disclosure. In FIG. 11, the horizontal axis is time t, and the vertical axis is gyroscope signal Gz in the z-axis direction. It may be seen from FIG. 11 that the first pose signal shows motion features associated with hand movements. Specifically, according to the motion feature in FIG. 11, the positive and negative values of the variation of the gyroscope signal Gz can be used to distinguish left hand and right. For example, in the movement of changing from L pose 720 to T pose 730, the gyroscope signal Gz generated by the wearable device 30 on the left hand has a large peak, while the gyroscope signal Gz generated by the wearable device 30 on the right hand has a large peak. The meter signal Gz has a large trough. According to this motion feature, the left hand node and the right hand node can be distinguished.

Figure 12:
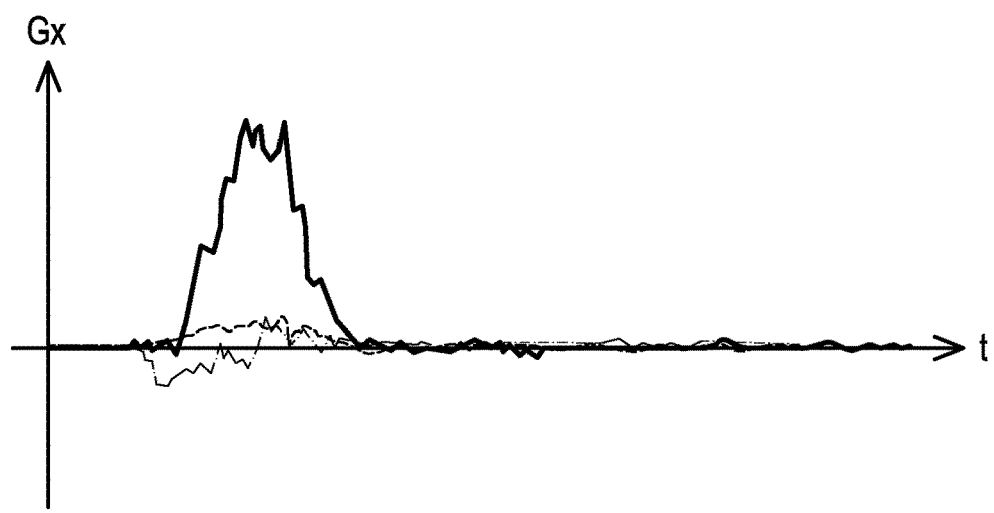
FIG. 12 and FIG. 13 are examples of second pose signals in an embodiment of the disclosure.
Figure 13:
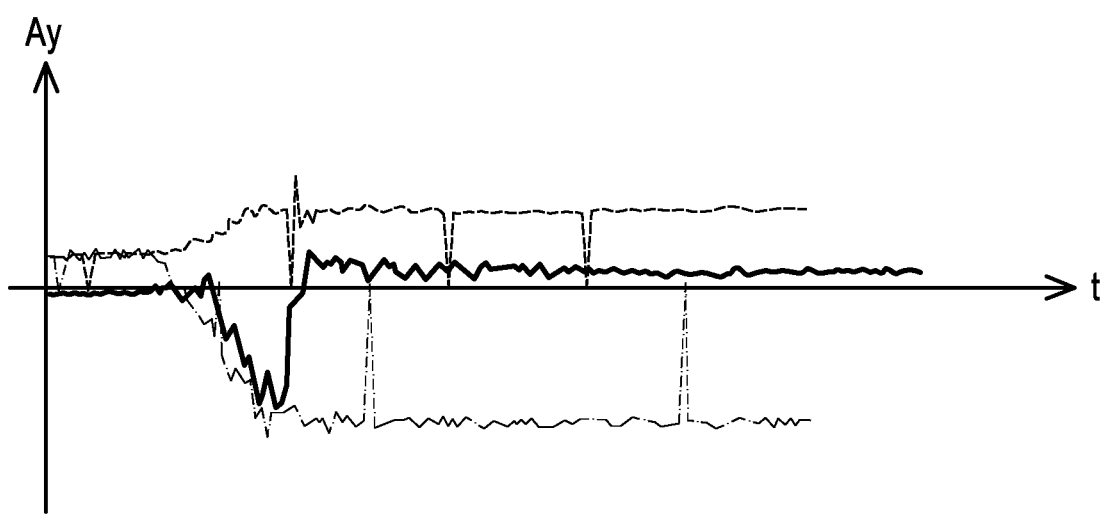

FIG. 12 and FIG. 13 are examples of second pose signals in an embodiment of the disclosure. In FIG. 12, the horizontal axis is time t, and the vertical axis is the gyroscope signal Gx in the x-axis direction. In FIG. 13, the horizontal axis represents time t, and the vertical axis represents the accelerometer signal Ay in the y-axis direction. It may be seen from FIG. 12 and FIG. 13 that the second pose signal shows the motion feature associated with the hand movement. During the movement of changing from the T pose 730 to the shoulder-touching pose 740, the gyroscope signal Gx and/or the accelerometer signal Ay of wearable devices 30 on the same hand may include the motion features shown in FIG. 12 and FIG. 13.

Specifically, according to the motion features in FIG. 12 and FIG. 13, the gyroscope signal Gx and/or the accelerometer signal Ay may be used to distinguish wearable devices 30 on the same hand. For example, since the rotation or movement speed is proportional to the distance, when a wearable device 30 rotates along the origin by a fixed angle within a period of time, the farther the wearable device 30 is from the origin, the faster its rotation speed or movement speed will be. When the wearable device 30 moves a fixed distance in a fixed direction, the wearable device 30 can be identified by the signal with the most drastic change if the change, the maximum value, and the minimum value of the gyroscope signal Gx and/or the accelerometer signal Ay of all devices are collected during this time.

[The Stage S620 of Identifying the Head Node]

Figure 14:
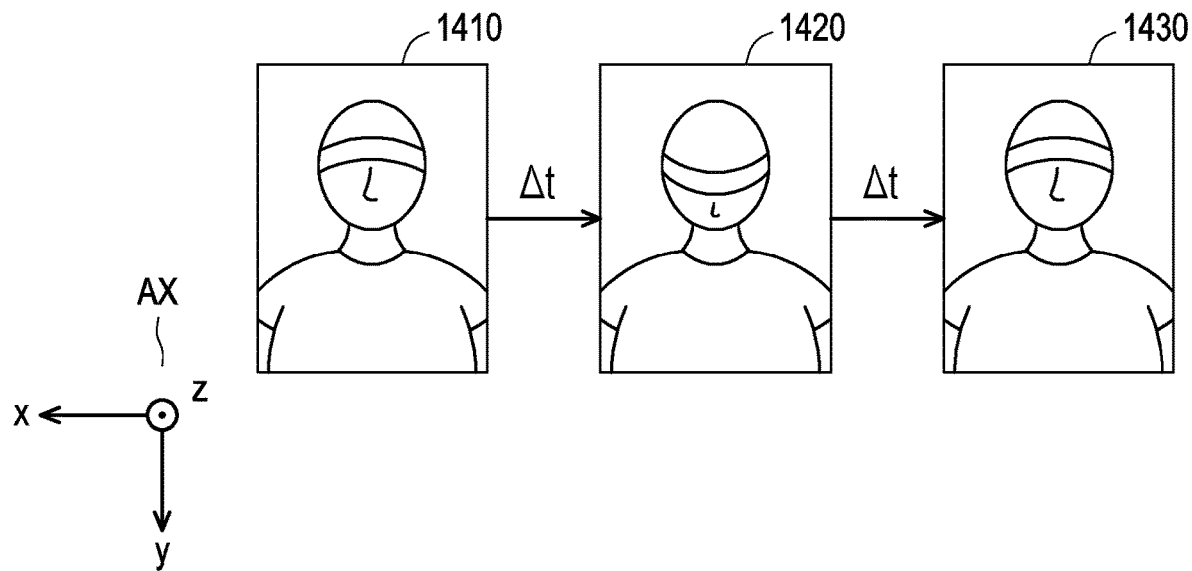
FIG. 14 is a schematic diagram of identifying a head node in an embodiment of the disclosure.

FIG. 14 is a schematic diagram of identifying a head node 102 in an embodiment of the disclosure. Please refer to FIG. 14, the direction of the sensor of each wearable device 30 is set as shown by the coordinate axis. The positive direction of the x-axis points to the left, the positive direction of the y-axis points downward, and the positive direction of the z-axis is the direction out of the paper. The user wears the wearable devices 30, and performs head movement according to a prompt message to identify a wearable device 30 corresponding to the head node among the multiple wearable devices 30. The head movement is, for example, a motion of nodding downward (along the y-axis direction in FIG. 14).

In one embodiment, after the process of identifying the head node 102 is started, the user is indicated by the prompt message to perform a movement of nodding downward. Specifically, the user changes from a head-up pose 1410 to the nodding-down pose 1420 within a predetermined time Δt, and then returns to a head-up pose 1430. At this time, the sensors of the plurality of wearable devices 30 generate a third pose signal in response to the movement of nodding downward. The third pose signal may include a motion feature associated with the user's head movement. The plurality of wearable devices 30 transmit the sensor data including the third pose signal to the processing device 40. Subsequently, the processing device 40 analyzes the sensor data and identifies the plurality of wearable devices 30 as at least one head node.

Figure 15:
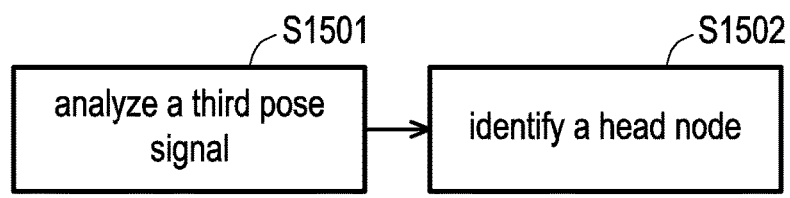
FIG. 15 is a flowchart of identifying a head node in an embodiment of the disclosure.

FIG. 15 is a flowchart for identifying a head node 102 in an embodiment of the disclosure. In step S1501, analyze the third pose signal. Specifically, the third pose signal may include a gyroscope signal and/or an accelerometer signal generated corresponding to the user's head movement of nodding downward. In one embodiment, a signal maximum value is collected from the third pose signal. In step S1502, the head node 102 is identified. In one embodiment, in response to the signal maximum value being greater than a signal threshold, it is determined that the wearable devices 30 are the head nodes 102.

In one embodiment, the gyroscope signal of the third pose signal is used to identify the head node 102. The step S1501 and step S1502 may be calculated and determined by the following formulas (5-1), (5-2):

$$V_{iMAX} = \text{Max}(G_{p\ i\ T1} \sim G_{p\ i\ T2}) \quad (5\text{-}1)$$

$$D_{Head} = \text{Argmax}_i \ (V_{iMAX} > Th_H) \quad (5\text{-}2)$$

The variable $D_{Head}$ represents the identification number of the wearable device 30 identified as the head node 102. The variable $V_{iMAX}$ represents the signal maximum value. $Th_H$ indicates the signal threshold. p is the directions of x, y, and z axes, and p may be different according to the preset placement directions of the wearable device 30. i is the identification number of the wearable device 30. T1 is the start time of the user's head movement of nodding downward. T2 is the end time of the user's head movement of nodding downward. $G_{p\ i}$ indicates the gyroscope signal. $\text{Max}(G_{p\ i\ T1} - G_{p\ i\ T2})$ refers to finding the maximum value of the gyroscope signal.

In formula (5-2), $\text{Argmax}_i \ (V_{iMAX} > Th_H)$ is to determine whether the variable $V_{iMAX}$ of the wearable device 30 is greater than the signal threshold $Th_H$. If the condition is satisfied, it is determined that the wearable device 30 is the head node 102.

In one embodiment, the value of the signal threshold $Th_H$ in the formula (5-2) ranges from "60.9" to "182.9", and the unit of the signal threshold $Th_H$ is degrees per second (dps).

In one embodiment, the accelerometer signal of the third pose signal is used to identify the head node 102, step S1501 and step S1502 may be calculated and determined by the following formulas (6-1), (6-2):

$$V_{iMAX} = \text{Max}(A_{p\,i\,T1} \sim A_{p\,i\,T2}) \quad (6\text{-}1)$$

$$D_{Head} = \text{Argmax}_i \ (V_{iMAX} > Th_H) \quad (6\text{-}2)$$

The variable $D_{Head}$ represents the identification number of the wearable device 30 identified as the head node 102. The variable $V_{iMAX}$ represents the signal maximum value. $Th_H$ indicates the signal threshold. p is the directions of x, y, and z axes, and p may be different according to the preset placement directions of the wearable device 30. i is the identification number of the wearable device 30. T1 is the start time of the user's head movement of nodding downward. T2 is the end time of the user's head movement of nodding downward. $A_{p\,i}$ indicates the accelerometer signal. $\text{Max}(A_{p\,i\,T1} - A_{p\,i\,T2})$ refers to finding the maximum value of the accelerometer signal.

In formula (6-2), $\text{Argmax}_i$ ($V_{iMAX} > Th_H$) is to determine whether the variable $V_{iMAX}$ of the wearable device 30 is greater than the signal threshold $Th_H$. If the condition is satisfied, it is determined that the wearable device 30 is the head node 102.

In one embodiment, the value of the signal threshold $Th_H$ in the formula (6-2) is "0.1464", and the unit of the signal threshold in the formula (6-2) $Th_H$ is gram (g).

Figure 16:
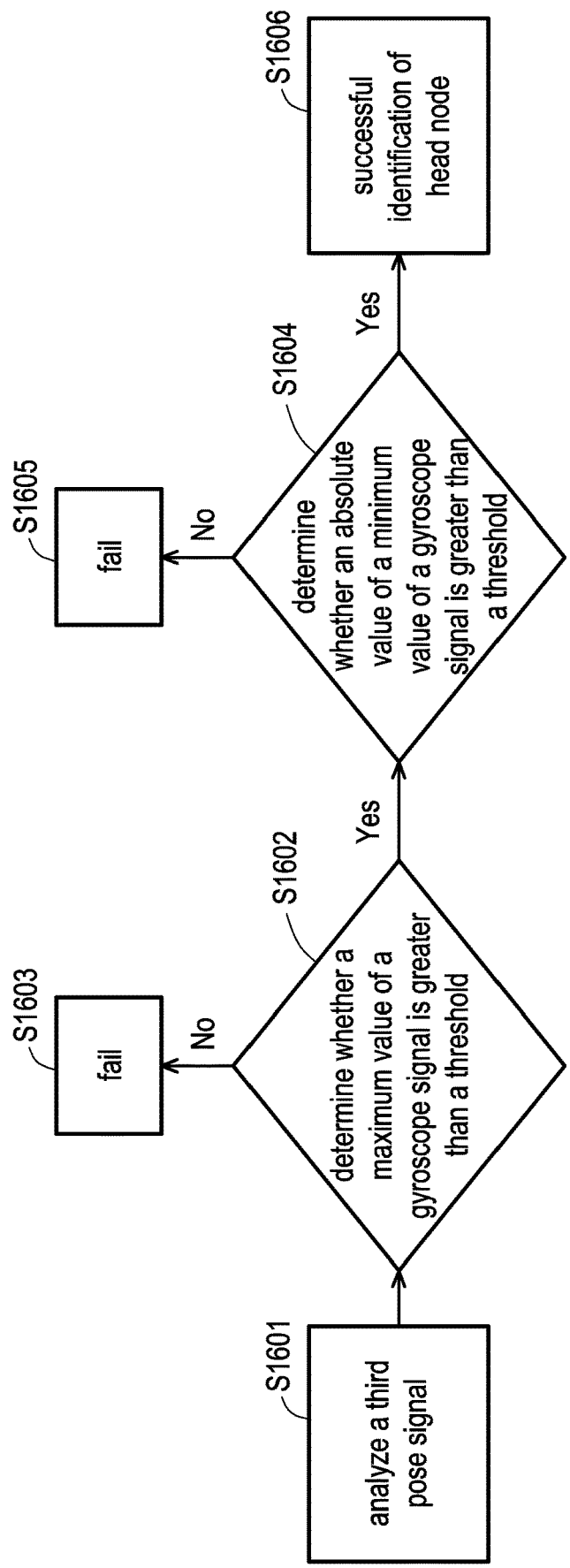
FIG. 16 is a flowchart of identifying a head node in an embodiment of the disclosure.

FIG. 16 is a flowchart for identifying a head node 102 in an embodiment of the disclosure. In step S1601, analyze the third pose signal. The third pose signal may include a motion feature associated with the user's head movement. In one embodiment, the head node 102 may be identified by using the motion feature of the user's head movement of nodding downward presented in the gyroscope signal of the x-axis or the jitter waveform of the gyroscope signal of the z-axis. Specifically, in an embodiment, the maximum value of the gyroscope signal and the minimum value of the gyroscope signal are extracted from the third pose signal. In step S1602, it is determined whether the maximum value of the gyroscope signal is greater than a threshold value. If the determination result of step S1602 is "Yes", proceed to step S1604. In step S1604, it is determined whether the absolute value of the minimum value of the gyroscope signal is greater than a threshold value. If the determination result of step S1604 is "Yes", then in step S1606 it is determined that the head node 102 is successfully identified. If the determination result of step S1602 is "No", then it is determined in step S1603 that the identification fails, and step S1604 is not continued. If the determination result of step S1604 is "No", then it is determined in step S1605 is that the identification fails. When the identification fails, the user is prompted to perform the identification again.

Figure 17:
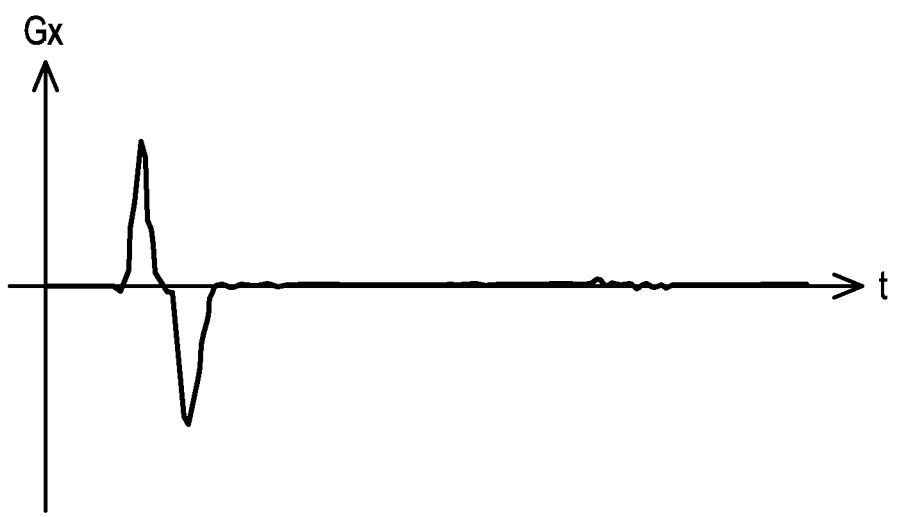
FIG. 17 is an example of a third pose signal in an embodiment of the disclosure.

FIG. 17 is an example of a third pose signal in an embodiment of the disclosure. In FIG. 17, the horizontal axis is the time t, and the vertical axis is the gyroscope signal Gx in the x-axis direction. It may be seen from FIG. 17 that the third pose signal shows the motion feature associated with the head movement. Specifically, the movement of nodding downward will cause the wearable device 30 on the head node 102 to generate a motion feature of an upward waveform and a downward waveform. Therefore, the wearable device 30 on the head node 102 may be identified according to this motion feature.

[The Stage S630 of Identifying the Central Part Node]

Figure 18:
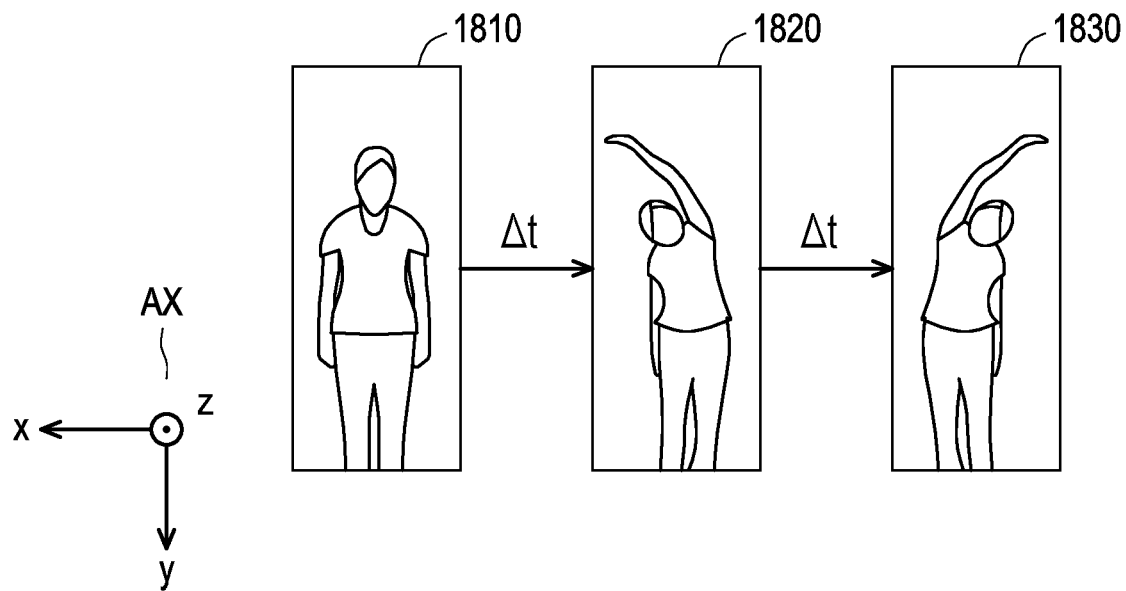
FIG. 18 is a schematic diagram of identifying central part nodes in an embodiment of the disclosure.

FIG. 18 is a schematic diagram of identifying central part nodes in an embodiment of the disclosure. As shown in FIG. 18, in an embodiment, the poses indicated by the prompt message include a standing pose 1810, a right bending and extending pose 1820, and a left bending and extending pose 1830. The user wears multiple wearable devices 30, and performs movements according to the pose indicated by a prompt message to identify the wearable device 30 corresponding to the central part node among the multiple wearable devices 30. In FIG. 18, the orientation of the sensors of each wearable device 30 is shown on the coordinate AX. The positive direction of the x-axis points to the left, the positive direction of the y-axis points downward, and the positive direction of the z-axis is the direction out of the paper.

Before starting the process of identifying the central node, the user first prepares in the standing pose 1810. When the identification process starts, the user performs and maintains the right bending and extending pose 1820 within a predetermined time Δt according to the prompt message. Then, the user changes from the right bending and extending pose 1820 to the left bending and extending pose 1830 within a predetermined time Δt according to the prompt message. At this time, the sensors of the plurality of wearable devices 30 generate a fourth pose signal in response to the movement of changing from the right bending and extending pose 1820 into the left bending and extending pose 1830. The fourth pose signal may include a motion feature associated with a user's central part movement. The plurality of wearable devices 30 transmit the sensor data including the fourth pose signal to the processing device 40. Subsequently, the processing device 40 analyzes the sensor data and identifies the plurality of wearable devices 30 as at least one central part node.

Figure 19:
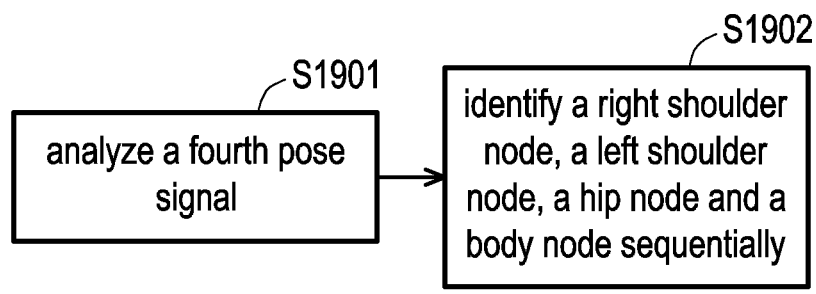
FIG. 19 is a flow chart for identifying central part nodes in an embodiment of the disclosure.

FIG. 19 is a flow chart for identifying central part nodes in an embodiment of the disclosure. In step S1901, analyze the fourth pose signal. Specifically, the fourth pose signal may include a gyroscope signal and/or an accelerometer signal generated corresponding to the movement of changing from the right bending and extending pose 1820 into the left bending and extending pose 1830. In one embodiment, the step of analyzing the fourth pose signal includes: collecting a maximum value of a gyroscope signal and a minimum value of a gyroscope signal from the fourth pose signal; finding the wearable device 30 corresponding to the maximum value of the gyroscope signal from the wearable devices 30; finding the wearable device 30 corresponding to the minimum value of the gyroscope signal from the wearable devices 30.

In step S1902, the right shoulder node 101, the left shoulder node 103, the hip node 111 and the body node 106 are sequentially identified.

In one embodiment, the step of identifying the right shoulder node 101 includes: in response to the maximum value of the gyroscope signal being greater than a signal threshold, determining that the wearable device 30 corresponding to the maximum value of the gyroscope signal is the right shoulder node 101. It should be noted that, in a preferred embodiment, the stage S610 of identifying the hand node and the stage S620 of identifying the head node have been completed before the stage S630 of identifying the central part node. That is to say, in this embodiment, the hand node and the head node have been excluded before step S1902 is executed. Therefore, the hand node and the head node will not be falsely identified as the central part node.

In one embodiment, the step of identifying the left shoulder node 103 includes: in response to the absolute value of the minimum value of a gyroscope signal being greater than the signal threshold, determining that the wearable device 30 corresponding to the minimum gyroscope signal is the left shoulder node 103.

In one embodiment, the step of identifying the hip node 111 includes: in response to a maximum value of the gyroscope signal is greater than the signal threshold and a wearable device 30 corresponding to the maximum value of the gyroscope signal is not the right shoulder node 101 and not the left shoulder node 103, determining that the wearable device 30 corresponding to the maximum value of the gyroscope signal is the hip node 111.

In one embodiment, the step of identifying the body node 106 includes: in response to a maximum value of the gyroscope signal is greater than the signal threshold and a wearable device 30 corresponding to the maximum value of the gyroscope signal is not the right shoulder node 101, not the left shoulder node 103, and not the hip node 111, it is determined that the wearable device 30 corresponding to the maximum value of the gyroscope signal is the body node 106.

In one embodiment, step S1901 and step S1902 may be represented by the following formulas (7-1), (7-2), (7-3), (7-4), (7-5), (7-6) for calculation and determination:

$$V_{iMAX} = \text{Max}(G_{p\ i\ T1} \sim G_{p\ i\ T2}) \quad (7\text{-}1)$$

$$V_{iMIN} = \text{Min}(G_{p\ i\ T1} \sim G_{p\ i\ T2}) \quad (7\text{-}2)$$

$$D_{RS} = \text{Argmax}_i\ [\text{Max}(V_{iMAX})\ \&\ (V_{iMAX} > Th_H)] \quad (7\text{-}3)$$

$$D_{LS} = \text{Argmax}_i\ [\text{Min}(V_{iMIN})\ \&\ (|V_{iMIN}| > Th_H)] \quad (7\text{-}4)$$

$$D_{hip} = \text{Argmax}_i\ [\text{Max}(V_{iMAX})\ \&\ (V_{iMAX} > Th_H)\ \&\ (D_{hip} \neq D_{LS})\ \&\ (D_{hip} \neq D_{RS})] \quad (7\text{-}5)$$

$$D_{body} = \text{Argmax}_i\ [\text{Max}(V_{iMAX})\ \&\ (V_{iMAX} > Th_H)\ \&\ (D_{body} \neq D_{LS})\ \&\ (D_{body} \neq D_{RS})\ \&\ (D_{body} \neq D_{hip})] \quad (7\text{-}6)$$

$G_{p\ i}$ represents the gyroscope signal. The variable $V_{iMAX}$ represents the maximum value of the gyroscope signal. The variable $V_{iMIN}$ represents the minimum value of the gyroscope signal. The variable $D_{RS}$ represents the identification number of the wearable device 30 identified as the right shoulder node 101. The variable $D_{LS}$ represents the identification number of the wearable device 30 identified as the left shoulder node 103. The variable $D_{hip}$ represents the identification number of the wearable device 30 identified as the hip node 111. The variable $D_{body}$ represents the identification number of the wearable device 30 identified as the body node 106. $Th_H$ indicates the signal threshold. p is the directions of x, y, and z axes, and p may be different according to the preset placement directions of the wearable device 30. i is the identification number of the wearable device 30. T1 is the start time of the movement of changing from the right bending and extending pose 1820 into the left bending and extending pose 1830. T2 is the end time of the movement of changing from the right bending and extending pose 1820 into the left bending and extending pose 1830.

The calculation of formula (7-3) is to find a wearable device 30 with the largest variable $V_{iMAX}$ and the variable $V_{iMAX}$ is greater than the signal threshold value $Th_H$. If the condition is satisfied, it is determined that the wearable device 30 is the right shoulder node 101.

The calculation of formula (7-4) is to find the wearable device 30 that has the smallest variable $V_{iMIN}$ and the absolute value $|V_{iMIN}|$ of the variable $V_{iMIN}$ is greater than the signal threshold value $Th_H$. If the condition is satisfied, it is determined that this wearable device 30 is the left shoulder.

The calculation of formula (7-5) is to determine the condition of the wearable device 30 with the largest variable $V_{iMAX}$ (the first value), and the variable $V_{iMAX}$ is greater than the signal threshold $Th_H$, and the wearable device 30 is not the left shoulder node 103 and not the right shoulder node 101. If the condition is satisfied, it is determined that the wearable device 30 is the hip node 111. It should be noted that since the left shoulder node 103 and the right shoulder node 101 have already been determined after the determination of formula (7-3) and formula (7-4), in the determination of formula (7-5), signals corresponding to the left shoulder node 103 and the right shoulder node 101 are excluded. In other words, the variable maximum value $V_{iMAX}$ (first value) obtained in formula (7-5) will not be the same as the variable maximum value $V_{iMAX}$ obtained in formula (7-3).

The calculation of formula (7-6) is to determine the condition of a wearable device 30 with the largest variable $V_{iMAX}$ (the second value), and the variable $V_{iMAX}$ is greater than the signal threshold $Th_H$, and the wearable device 30 is not the left shoulder node 103, not the right shoulder node 101 and not the hip node 111. If the condition is satisfied, it is determined that the wearable device 30 is the body node 106.

In one embodiment, the value of the signal threshold $Th_H$ of formulas (7-1), (7-2), (7-3), (7-4) and (7-5) is "15.2 (dps)".

Figure 20:
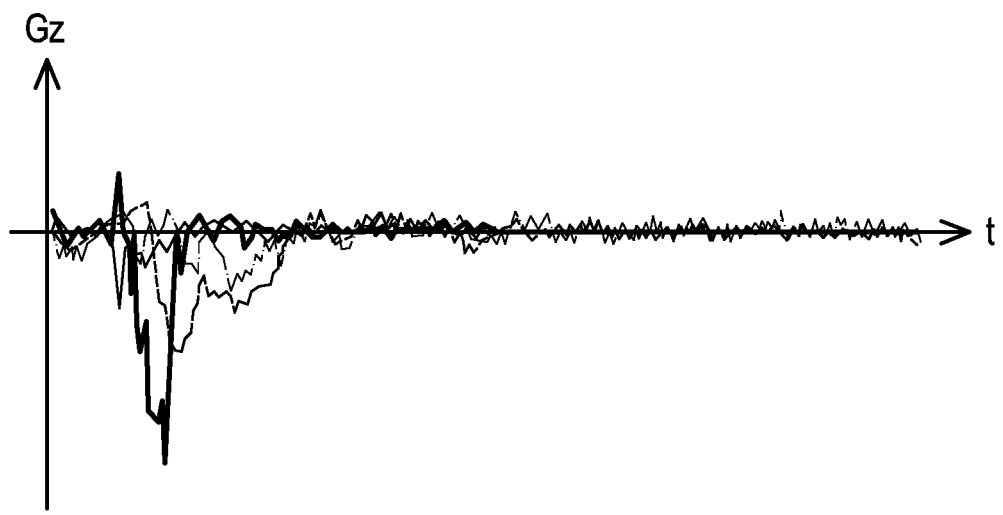
FIG. 20 and FIG. 21 are examples of fourth pose signals in an embodiment of the disclosure.
Figure 21:
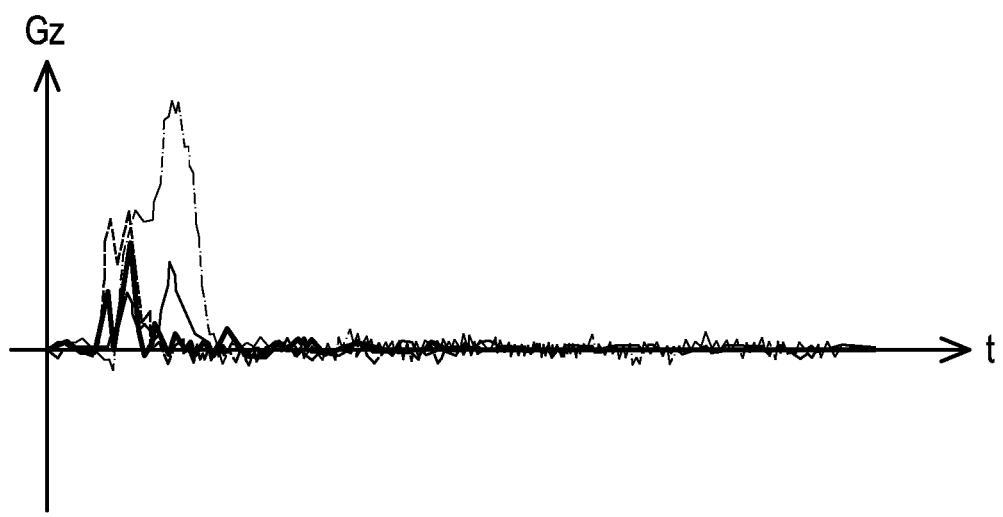

FIG. 20 and FIG. 21 are examples of fourth pose signals in an embodiment of the disclosure. In FIG. 20 and FIG. 21, the horizontal axis represents time t, and the vertical axis represents the gyroscope signal Gz in the z-axis direction. It may be seen from FIG. 20 and FIG. 21 that the fourth pose signals show the motion feature associated with the user's central part movement. During the movement of changing from the right bending and extending pose 1820 to the left bending and extending pose 1830, the gyroscope signals Gz of wearable devices 30 on the central nodes present the motion features shown in FIG. 20 and FIG. 21.

Specifically, when the right bending and extending pose 1820 is performed, the gyroscope signal Gz of the wearable device 30 on the left shoulder node 103 will change drastically. When the left side bending and extending pose 1830 is performed, the gyroscope signal Gz of the wearable device 30 on the right shoulder node 101 will change drastically. Moreover, for the hip node 111 and the body node 106, the signal variation of the wearable device 30 on the hip node 111 is larger than the signal variation of the wearable device 30 on the body node 106. Therefore, according to the motion features of FIG. 20 and FIG. 21, the wearable devices 30 on the central part nodes can be distinguished by using the gyroscope signal Gz.

[Stage S640 of Identifying Foot Nodes]

Figure 22:
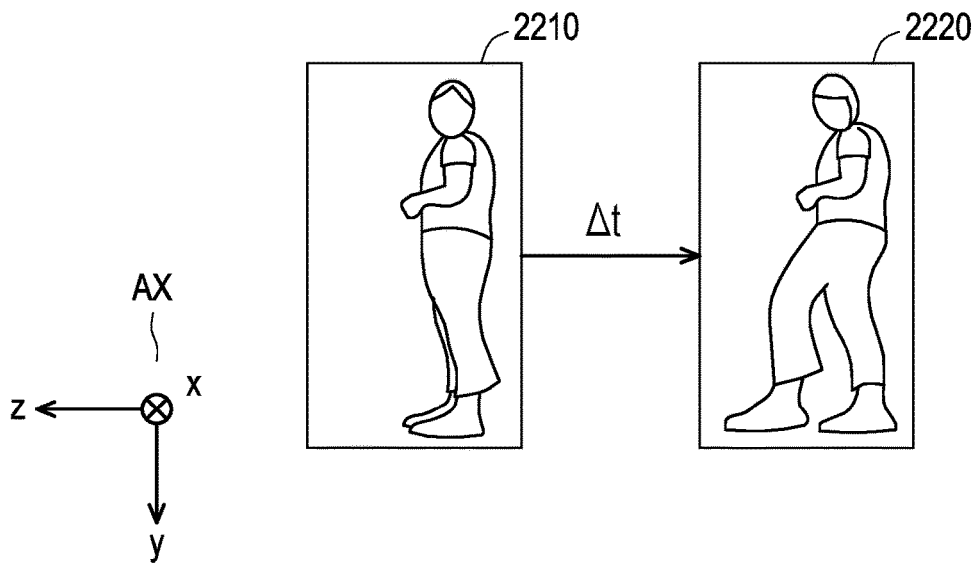
FIG. 22 is a schematic diagram of identifying foot nodes in an embodiment of the disclosure.

FIG. 22 is a schematic diagram of identifying foot nodes in an embodiment of the disclosure. As shown in FIG. 22, in one embodiment, after the identification process has started, the user changes from a natural standing pose 2210 to the left foot first stepping pose 2220 according to a prompt message. In FIG. 18, the orientation of the sensors of each wearable device 30 is shown on the coordinate AX, and pose 2210 and pose 2220 are side views. In the coordinate AX, the positive direction of the x-axis is the direction into the paper, the positive direction of the y-axis points downward, and the positive direction of the z-axis points to the left.

The user changes from the natural standing pose 2210 to the left foot first stepping pose 2220 according to the prompt message, and then walks naturally within a predetermined time Δt. At this moment, the sensors of the plurality of wearable devices 30 generate fifth pose signals in response to the pose 2220 in which the left foot steps out first and the natural walking. The fifth pose signal may include a motion feature associated with the user's foot movement. The plurality of wearable devices 30 transmit the sensor data including the fifth pose signal to the processing device 40. Subsequently, the processing device 40 analyzes the sensor data and identifies the plurality of wearable devices 30 as at least one foot node.

Figure 23:
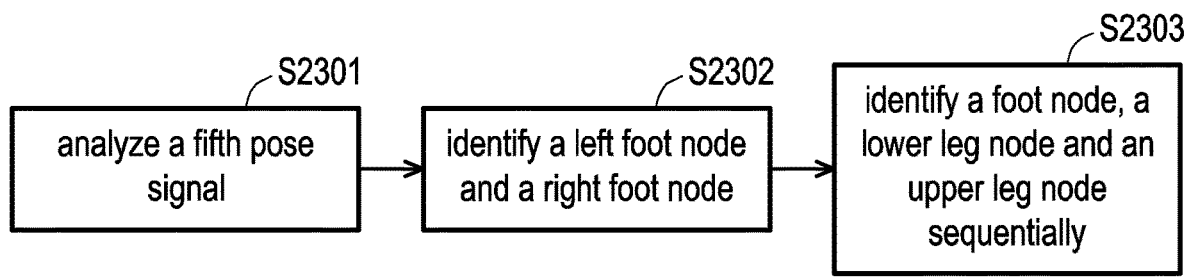
FIG. 23 is a flowchart of identifying foot nodes in an embodiment of the disclosure.

FIG. 23 is a flowchart of identifying foot nodes in an embodiment of the disclosure. In step S2301, the fifth pose signal is analyzed. In one embodiment, the step of analyzing the fifth pose signal includes: finding a timestamp at which a peak value of a gyroscope signal is first greater than a threshold value from the fifth pose signal; finding the wearable device 30 corresponding to the maximum value of the timestamp from the wearable devices 30.

In one embodiment, step S2301 obtains the variables described by the following formulas (8-1), (8-2):

$$FP_i = \text{First } G_{p\ i} \text{ Peak} > Th_{Move} \quad (8-1)$$

$$ts_i = TS(FP_i) \quad (8-2)$$

The variable $FP_i$ represents the first gyroscope signal peak value of the wearable device 30 that is greater than a threshold during the pose 2220 and the natural walking. First $G_{p\ i}$ Peak indicates the peak value of the gyroscope signal. i is the identification number of the wearable device 30. p is the directions of x, y, and z axes, and p may be different according to the preset placement directions of the wearable device 30. $Th_{Move}$ indicates the threshold value. $ts_i$ represents a timestamp. Variable $TS(FP_i)$ is to record the timestamp of the peak value $FP_i$ of the gyroscope signal.

In one embodiment, the threshold value $Th_{Move}$ of formula (8-1) is "30.4 (dps)".

In step S2302, the left foot node and the right foot node are identified. In one embodiment, the step of identifying the left foot node includes: determining that the wearable device 30 corresponding to the maximum value of the timestamp is the at least one left foot node. In one embodiment, the step of identifying the right foot node includes: determining that the wearable devices 30 are the at least one right foot node in response to the wearable devices 30 not being the at least one left foot node.

In one embodiment, step S2302 uses the following formulas (8-3), (8-4), (8-5) to determine:

$$L_1 = \text{Argmax}_i(ts_i) \quad (8-3)$$

$$L_2 = \text{Argmax}_i(ts_i) \ \& \ (L_2 \neq L_1) \quad (8-4)$$

$$L_3 = \text{Argmax}_i(ts_i) \ \& \ (L_3 \neq L_1) \ \& \ (L_3 \neq L_2) \quad (8-5)$$

The variable $L_1$ represents the identification number of the first wearing device 30 identified as the at least one left foot node. $L_2$ represents the identification number of the second wearable device 30 identified as the at least one left foot node. $L_3$ represents the identification number of the third wearable device 30 identified as the at least one left foot node.

The purpose of the above formulas (8-3), (8-4), (8-5) is to identify whether the wearable device 30 of a foot is located on the left foot or the right foot. When all the wearing devices 30 on the left foot have been identified, it is determined that the remaining wearing devices 30 are on the right foot. In one embodiment, according to the prompt message instructing the user to step out the left foot or the right foot first, the order of determining the left foot or the right foot may be reversed. For example, the prompt message may instruct the user to step on the right foot first, and then identify the right foot first. When all the wearing devices 30 on the right foot have been identified, it is determined that the remaining wearing devices 30 are located on the left foot.

In step S2303, the foot node, the lower leg node and the upper leg node are sequentially identified.

In one embodiment, the step of analyzing the fifth pose signal includes: collecting an accumulation value of squared gyroscope signals from the fifth pose signal; finding the wearable device 30 corresponding to the maximum value (first value, or the first maximum value) of the accumulation value of the squared gyroscope signals from the wearable devices 30.

Specifically, in an embodiment, analyzing the fifth pose signal may be calculated by the following formula (9-1):

$$E_i = \sum_{T_1}^{T_2} (G_{p\ i})^2 \quad (9-1)$$

The variable $E_i$ represents the accumulation value of the squared gyroscope signal. $G_{p\ i}$ represents the gyroscope signal. p is the directions of x, y, and z axes, and p may be different according to the preset placement directions of the wearable device 30. i is the identification number of the wearable device 30. T1 is the start time of the pose 2220 in which the left foot steps out first. T2 is the end time of natural walking.

In one embodiment, the step of identifying the foot node includes: determining that the wearable device 30 corresponding to the maximum value of the accumulation value of the squared the gyroscope signal is the foot node. Specifically, in one embodiment, the identification of foot nodes may be determined by the following formula (9-2):

$$D_{Foot} = \text{Argmax}_i (E_i) \quad (9-2)$$

The variable $D_{Foot}$ represents the number of the wearing device 30 identified as the foot node. $\text{Argmax}_i (E_i)$ finds the wearable device 30 corresponding to the maximum value (the first value) of the accumulation value of the squared gyroscope signal.

In one embodiment, the step of identifying the lower leg node includes: in response to a wearable device 30 corresponding to the maximum value (second value) of the accumulation value of the squared gyroscope signal is not a foot node, determining that the wearable device 30 corresponding to the maximum value (second value) of the accumulation value of the squared gyroscope signal is the lower leg node.

Specifically, in one embodiment, identifying the lower leg node may be determined by the following formula (9-3):

$$D_{LL} = \text{Argmax}_i \ (E_i) \ \& \ (D_{LL} \neq D_{Foot}) \quad (9\text{-}3)$$

The variable $D_{LL}$ represents the identification number of the wearable device 30 identified as the lower leg node.

It should be noted that since the foot node has been determined in the formula (9-2). In the formula (9-3), the foot node has been excluded, and then the maximum value (the second value) is taken. Specifically, this second value is the second maximum value of the accumulation value of the squared gyroscope signal. Therefore, the second value as found is different from the first value.

In one embodiment, the step of identifying the upper leg node includes: in response to the wearable device 30 corresponding to the maximum value (third value) of the accumulation value of the squared gyroscope signal being not the foot node and not the lower leg node, determining the wearable device 30 corresponding to the maximum value (the third value) of the accumulation value of the squared gyroscope signal is the upper leg node. Specifically, in one embodiment, identifying the upper leg node may be determined by the following formula (9-4):

$$D_{UL} = \text{Argmax}_i \ (E_i) \ \& \ (D_{UL} \neq D_{Foot}) \ \& \ (D_{UL} \neq D_{LL}) \quad (9\text{-}4)$$

The variable $D_{UL}$ represents the identification number of the wearing device 30 identified as the upper leg node.

It should be noted that since the foot node and the lower leg node have been determined in formula (9-2) and formula (9-3). In the formula (9-4), the foot node and the lower leg node have been excluded in advance, and then the maximum value (the third value) is taken. Specifically, the third value is the third maximum value of the accumulation value of the squared gyroscope signal excluding the foot node and the lower leg node. Therefore, the third value as found is different from the first value and the second value.

The formulas (9-1), (9-2), (9-3) and (9-4) are performed on the wearable device 30 on the same foot (the left foot or the right foot is determined according to step S2302). The formulas (9-1), (9-2), (9-3) and (9-4) may be applied to the left or right foot. From the wearable devices 30 on the same foot (which may be the left foot or the right foot), the foot node, the lower leg node and the upper leg node are sequentially identified.

Figure 24:
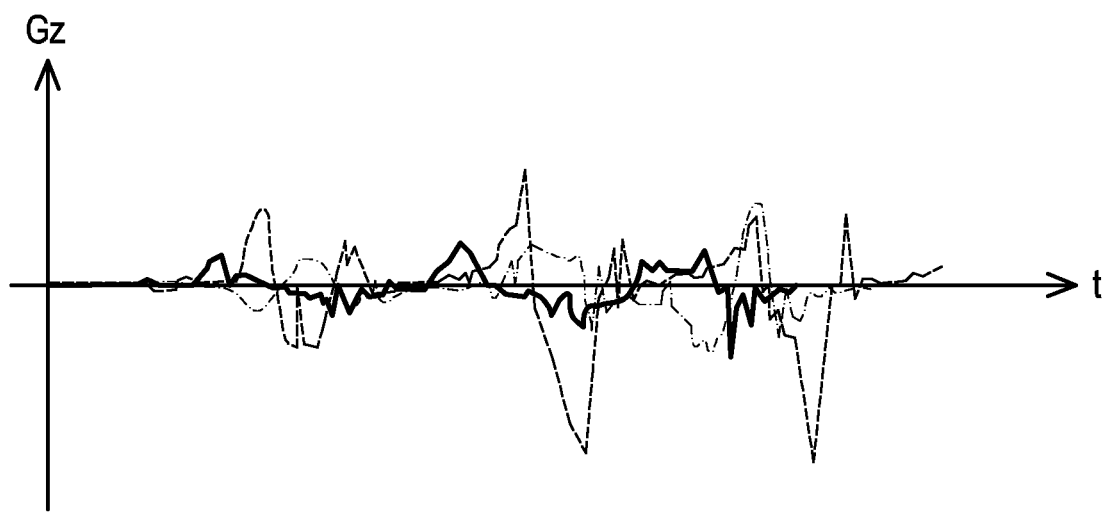
FIG. 24 and FIG. 25 are examples of fifth pose signals in an embodiment of the disclosure.
Figure 25:
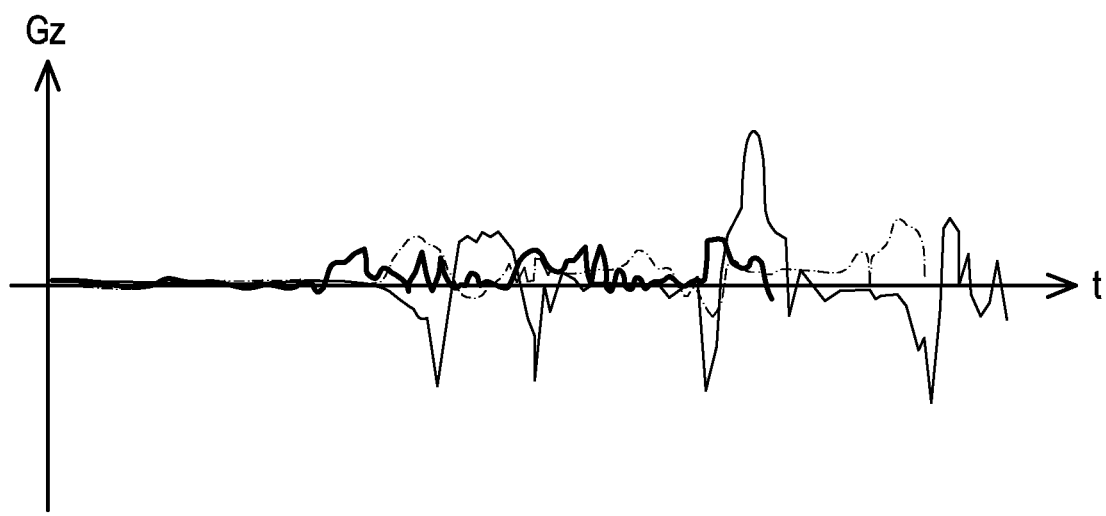

FIG. 24 and FIG. 25 are examples of fifth pose signals in an embodiment of the disclosure. In FIG. 24 and FIG. 25, the horizontal axis represents time t, and the vertical axis represents the gyroscope signal Gz in the z-axis direction. It may be seen from FIG. 24 and FIG. 25 that the fifth pose signals show the motion feature associated with user's foot movement. According to the motion features in FIG. 24 and FIG. 25, multiple wearable devices 30 on the foot nodes may be distinguished by using the gyroscope signal Gz.

During the user's foot movement of stepping out the left foot first and natural walking, the gyroscope signals Gz of multiple wearable devices 30 on a foot will present the motion features shown in FIG. 24 or FIG. 25. Specifically, since the left foot is stepped out first, the gyroscope signal Gz of the wearable device 30 on the left foot will have drastic changes. From the timing of the signal change, the left foot or right foot can be distinguished based on the chronological order in which the movement occurred. For example, as it is preset to walk with the left foot first and then the right foot, the timing of signal change for the left foot will be earlier than the timing of the signal change for the right foot. Moreover, during the movement of natural walking, the magnitude of the signal variation is sorted in the order of foot nodes, lower leg nodes, and upper leg nodes.

It should be noted that if the timing of signal change for the left foot is too close to the timing of signal change for the right foot, the signal of the left foot or the right foot may be intertwined and cannot be identified. Therefore, the timestamp average value and a time difference of the gyroscope signal can be further utilized in assisting the determination of whether the timing of the signal change for the left foot node and the right foot node may be distinguished.

Figure 26:
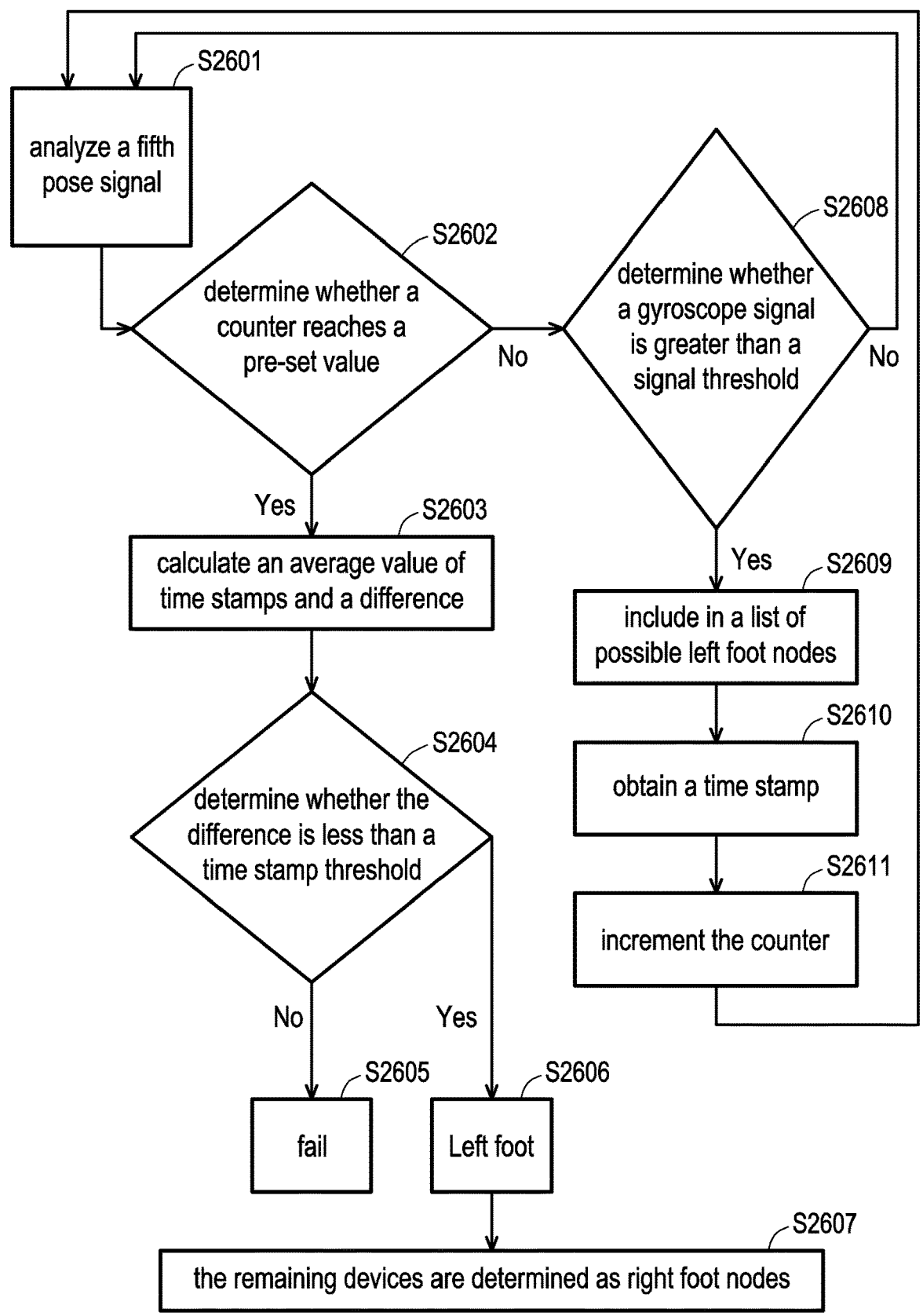
FIG. 26 is a flowchart for identifying foot nodes in an embodiment of the disclosure.

FIG. 26 is a flowchart for identifying left foot nodes and right foot nodes in an embodiment of the disclosure. In step S2601, the fifth pose signal is analyzed, and the gyroscope signal is extracted from the fifth pose signal.

In step S2602, determine whether the counter reaches a preset value. The preset value may be the number of wearable devices 30 to be identified. For example, the left foot node may include the left foot node 117, the left lower leg node 115, and the left upper leg node 113, and the preset value is set to "3", indicating the total number of left foot nodes to be identified. This counter is used to determine whether all possible devices have been fetched for the left foot.

If the determination result of step S2602 is "No", it means that all the wearable devices 30 that can be possible candidates of left foot nodes have not been collected, and then the process enters step S2608 to determine whether the gyroscope signal is greater than the signal threshold. If the determination result of step S2602 is "Yes", then proceed to step S2603 to determine whether the identification result of left foot nodes is successful or not by means of the timestamp average value and time difference.

In step S2603, the average value and difference of the timestamps are calculated. Specifically, the average value and difference of the timestamp are calculated by the following formulas (9-5), (9-6):

$$Avg = \text{mean}(ts_i) \quad (9\text{-}5)$$

$$Diff_i = |ts_i - Avg| \quad (9\text{-}6)$$

Avg represents the timestamp average. $ts_i$ indicates the timestamp at which the gyroscope signal is greater than the signal threshold. i is the number of all possible wearable devices 30 that can be a left foot node. $Diff_i$ indicates the difference between a timestamp of the wearable device 30 with the number i and the timestamp average.

In step S2604, it is determined whether the difference is smaller than a timestamp threshold $Th_{TIME}$. Specifically, it is determined whether the difference $Diff_i$ is smaller than the timestamp threshold $Th_{TIME}$.

If the determination result of step S2604 is "No", then in step S2605, it is determined that the identification fails, and the user is prompted to start the identification process again.

If the determination result of step S2604 is "Yes", then in step S2606, it is determined that all wearable devices 30 that may be left foot nodes are successfully identified as left foot nodes. Next, in step S2607, the remaining devices are determined as right foot nodes.

In one embodiment, the timestamp threshold $Th_{TIME}$ of step S2604 is "150 (milliseconds)".

In step S2608, it is determined whether the gyroscope signal is greater than the signal threshold. If the determination result of step S2608 is "Yes", it means that the wearable device 30 may be the left foot node. If the determination result of step S2608 is "No", then return to step S2601.

In one embodiment, the signal threshold value of step S2608 is "30.4 (dps)".

In step S2609, the wearable device 30 satisfying the condition of the gyroscope signal being greater than the signal threshold is included in the list of possible left foot nodes.

In step S2610, the timestamp at which the gyroscope signal of the wearable device 30 being greater than the signal threshold is obtained. In step S2611, the counter is incremented. After the counter is incremented, return to step S2601 to continue analyzing the fifth pose signal.

To sum up, according to the identification method and the wireless motion capturing system provided by the embodiments of the disclosure, the user may perform a simple identification process according to a prompt message, through stage of identifying the hand node, stage of identifying the head node, stage of identifying the central part node and/or stage of identifying the foot nodes, the nodes of virtual avatar model 10 corresponding to the multiple wearable devices 30 can be accurately identified.

Embodiments of the disclosure provide a set of determination criteria suitable for analyzing signal changes of wearable devices based on motion feature, including:

(1) Determination of Displacement:

When multiple devices are arranged in three-dimensional coordinates according to their defined positive directions on the same axis and fixed at different positions of the axis, when the coordinate axis rotates and the axis rotates along the origin for a fixed angle within a period of time, the farther the device is from the origin, the faster the rotation speed or movement speed will be. The rotation or moving speed is directly proportional to the distance. The difference in displacement can be used to distinguish the nodes corresponding to different signals.

(2) Determination of Variation:

After defining the positive direction of the device in the three-dimensional coordinates, the positive and negative values of the variation of the angle or distance can be used to distinguish the nodes corresponding to different signals.

(3) Determination of Variation Time:

The time difference of a motion can be used to distinguish the nodes corresponding to different signals according to the order of the occurrence time of each motion.

(4) Determination of Gyroscope and/or Accelerometer Signal Change:

When multiple devices are on different parts of the user's body, and a certain device moves a fixed distance in a certain direction, by collect variation, maximum value and/or minimum value of the gyroscope and/or accelerometer signal of all devices during this period, the signal change can be used to identify the node corresponding to the device with the most drastic signal variation.

The embodiments of the disclosure provide preferred identification methods for identifying hand nodes, identifying head nodes, identifying central part nodes, and/or identifying foot nodes based on the above determination criteria, but are not limited to the identification methods in the embodiments of the disclosure. The embodiment of the disclosure includes determination processes based on pose or motion features not listed in the above determination criteria and corresponding device signal changes.

[Application Software Interface]

Figure 27:
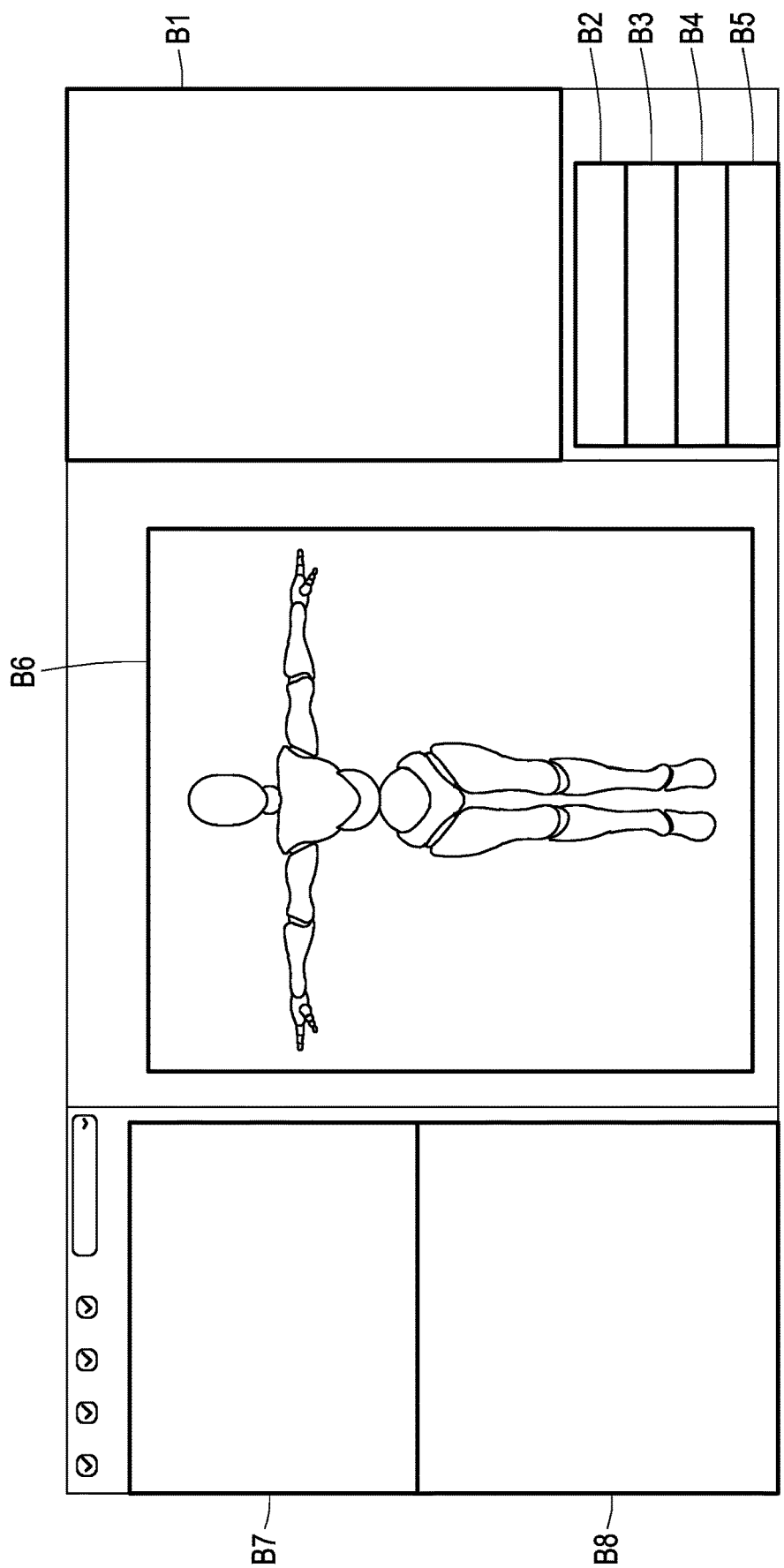
FIG. 27 is a schematic diagram of an application software interface in an embodiment of the disclosure.

FIG. 27 is a schematic diagram of an application software interface in an embodiment of the disclosure. In one embodiment, as shown in FIG. 27, the application software interface may include display block B1, display block B2, display block B3, display block B4, display block B5, display block B6, display block B7, and/or display block B8. Display block B1 is an area for device configuration. The device information is displayed and configured in display block B1. The device information displayed in display block B1 may include the device name, connection status, an option to calculate whether the device is paired with a magnetometer value, an option to select whether the transmission is at full speed, a display of the strength level (RSSI value) of the wireless signal, the frame rate, wearing position of the device, and/or the battery level. Display block B2 is the button to find the device. Display block B3 is the option to calibrate the Euler angle. Display block B4 is the button for recording quaternion data of all connected devices. Display block B5 shows the button to turn off all the devices. Display block B6 presents the user's movements captured by the wireless motion capture system and displays the virtual avatar model on the screen simultaneously. Display block B7 is used to observe information about a device in display block B1, including quaternion, accelerometer, magnetometer, or gyroscope values. Display block B8 shows the Euler angle of each device.

Figure 28:
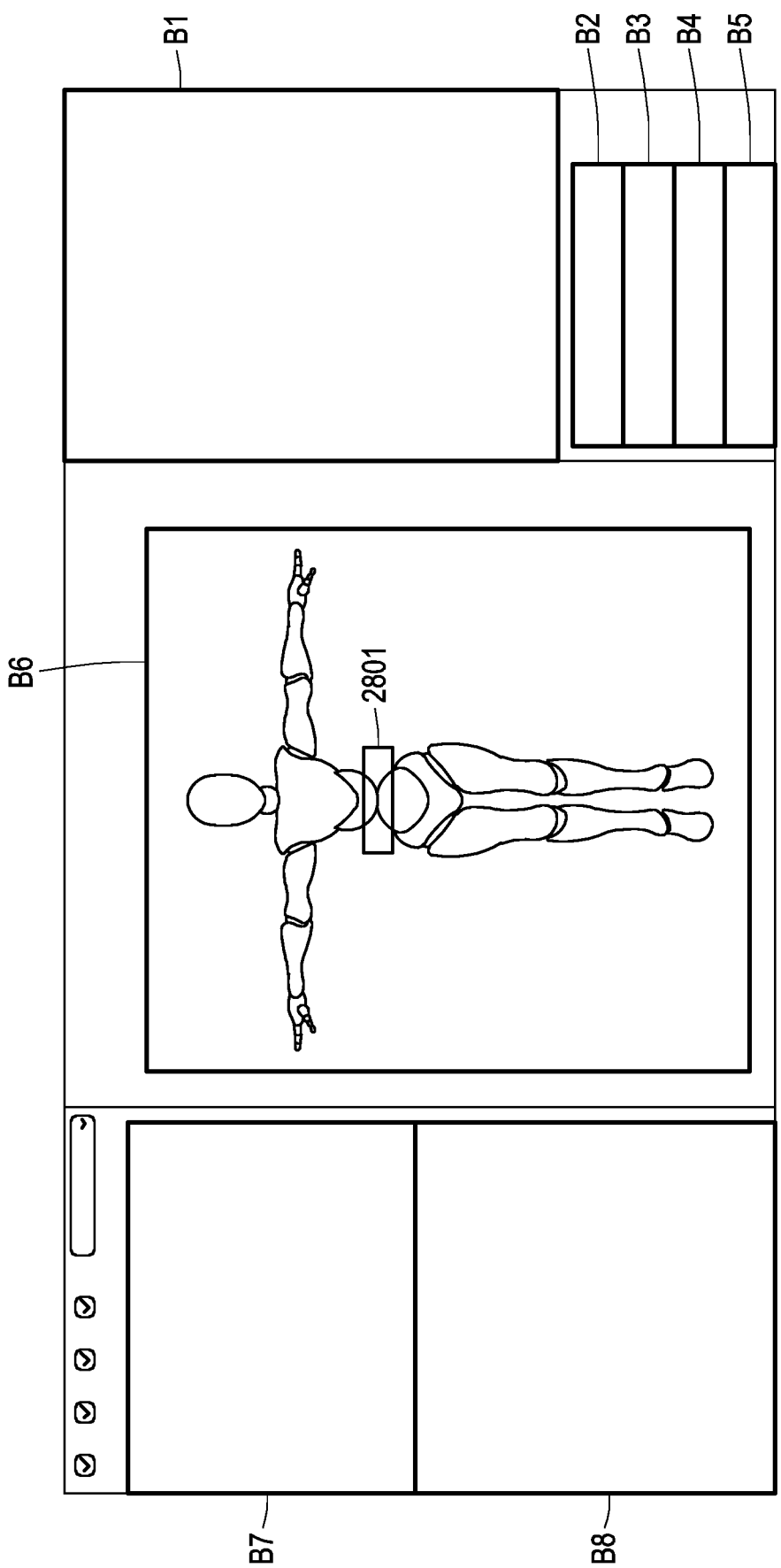
FIG. 28 is a schematic diagram of a prompt message in an embodiment of the disclosure.

FIG. 28 is a schematic diagram of a prompt message in an embodiment of the disclosure. When the process of device identification starts, the application software interface may display a prompt message 2801 on the screen to instruct the user to perform different poses or movements. In one embodiment, the prompt message 2801 includes a first prompt message. The first prompt message instructs the user to perform a hand movement associated with the first motion feature. In one embodiment, the prompt message 2801 includes a second prompt message. The second prompt message instructs the user to perform a head movement associated with the second motion feature. In one embodiment, the prompt message 2801 includes a third prompt message. The third prompt message instructs the user to perform a central part movement associated with the third motion feature. In one embodiment, the prompt message 2801 includes a fourth prompt message. The fourth prompt message instructs the user to perform a foot movement associated with the fourth motion feature.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An identification method, applicable to a wireless motion capturing system with a plurality of wearable devices, comprising:

receiving sensor data, wherein the sensor data is associated with a motion feature, and the motion feature corresponds to a plurality of nodes of a virtual avatar model, wherein the motion feature corresponds to a hand movement of the virtual avatar model, wherein the plurality of nodes comprising at least one left hand node and at least one right hand node, wherein the sensor data comprising a first pose signal corresponding to the hand movement; and analyzing the sensor data and identifying at least one of the plurality of nodes corresponding to each of the plurality of wearable devices, further comprising:
  collecting a gyroscope signal accumulation value, a gyroscope signal maximum value, and a gyroscope signal minimum value from that first pose signal;
  in response to the gyroscope signal accumulation value being greater than a first threshold and the gyroscope signal maximum value being greater than a signal threshold, determining the wearable devices as the at least one left hand node; and
  in response to the gyroscope signal accumulation value being greater than the first threshold and the absolute value of the gyroscope signal minimum value being greater than the signal threshold, determining the wearable devices as the at least one right hand node.

2. An identification method, applicable to a wireless motion capturing system with a plurality of wearable devices, comprising:
  receiving sensor data, wherein the sensor data is associated with a motion feature, and the motion feature corresponds to a plurality of nodes of a virtual avatar model, wherein the motion feature corresponds to a hand movement of the virtual avatar model, wherein the plurality of nodes comprising at least one left hand node and at least one right hand node, wherein the sensor data comprising a first pose signal corresponding to the hand movement; and
  analyzing the sensor data and identifying at least one of the plurality of nodes corresponding to each of the plurality of wearable devices, further comprising:
  collecting an accelerometer signal maximum value and an accelerometer signal minimum value from the first pose signal;
  recording a first timestamp corresponding to the accelerometer signal maximum value and a second timestamp corresponding to the accelerometer signal minimum value;
  in response to the first timestamp being less than the second timestamp and both the accelerometer signal maximum value and an absolute value of the accelerometer signal minimum value being greater than a signal threshold, determining the wearable devices as the at least one right hand node; and
  in response to the first timestamp being greater than the second timestamp and both the accelerometer signal maximum value and the absolute value of the accelerometer signal minimum value being greater than the signal threshold, determining the wearable devices as the at least one left hand node.

3. An identification method, applicable to a wireless motion capturing system with a plurality of wearable devices, comprising:
  receiving sensor data, wherein the sensor data is associated with a motion feature, and the motion feature corresponds to a plurality of nodes of a virtual avatar model, wherein the motion feature corresponds to a hand movement of the virtual avatar model, and the plurality of nodes comprising a hand node, wherein the sensor data comprising a second pose signal corresponding to the hand movement; and
  analyzing the sensor data and identifying at least one of the plurality of nodes corresponding to each of the plurality of wearable devices, further comprising:
    finding a gyroscope signal maximum value from the second pose signal;
    finding a wearable device that corresponds to the gyroscope signal maximum value; and
    determining the wearable device that corresponds to the gyroscope signal maximum value as the hand node.

4. The identification method of claim 3, wherein the plurality of nodes further comprising a lower arm node and an upper arm node, wherein the step of analyzing the sensor data and identifying at least one of the plurality of nodes corresponding to each of the plurality of wearable devices further comprising:
  finding, from the second pose signal, an accelerometer signal maximum value and an accelerometer signal minimum value of the wearable devices excluding wearable devices that corresponds to the hand node;
  calculating a variation according to the accelerometer signal maximum value and the accelerometer signal minimum value; and
  finding a wearable device that corresponds to the variation from the wearable devices.

5. The identification method of claim 4, wherein the step of analyzing the sensor data and identifying at least one of the plurality of nodes corresponding to each of the plurality of wearable devices further comprising:
  in response to the wearable device that corresponds to a first value of the variation is not the hand node, determining the wearable device that corresponds to the first value of the variation as the lower arm node.

6. The identification method of claim 5, wherein the step of analyzing the sensor data and identifying at least one of the plurality of nodes corresponding to each of the plurality of wearable devices further comprising:
  finding a wearable device that corresponds to a second value of the variation from the wearable devices; and
  in response to the wearable device that corresponds to the second value of the variation is not neither the hand node nor the lower arm node, determining the wearable device that corresponds to the second value of the variation as the upper arm node.

7. An identification method, applicable to a wireless motion capturing system with a plurality of wearable devices, comprising:
  receiving sensor data, wherein the sensor data is associated with a motion feature, and the motion feature corresponds to a plurality of nodes of a virtual avatar model, wherein the motion feature corresponds to a head movement of the virtual avatar model, the plurality of nodes comprising a head node, wherein the sensor data comprising a third pose signal corresponding to the head movement; and
  analyzing the sensor data and identifying at least one of the plurality of nodes corresponding to each of the plurality of wearable devices further, further comprising:
    collecting a signal maximum value from the third pose signal; and
    in response to the signal maximum value being greater than a signal threshold, determining the wearable devices that correspond to the signal maximum value as the head node.

8. An identification method, applicable to a wireless motion capturing system with a plurality of wearable devices, comprising:
  receiving sensor data, wherein the sensor data is associated with a motion feature, and the motion feature corresponds to a plurality of nodes of a virtual avatar model, wherein the motion feature corresponds to a central part movement of the virtual avatar model, the plurality of nodes comprising a right shoulder node and a left shoulder node, wherein the sensor data comprising a fourth pose signal corresponding to the central part movement; and analyzing the sensor data and identifying at least one of the plurality of nodes corresponding to each of the plurality of wearable devices, further comprising:

collecting a gyroscope signal maximum value and a gyroscope signal minimum value from the fourth pose signal;

find a wearable device corresponding to the gyroscope signal maximum value from the wearable devices;

find a wearable device corresponding to the gyroscope signal minimum value from the wearable devices;

in response to the gyroscope signal maximum value being greater than a signal threshold, determining the wearable device corresponding to the gyroscope signal maximum value as the right shoulder node; and in response to an absolute value of the gyroscope signal minimum value being greater than the signal threshold, determining the wearable device corresponding to the gyroscope signal minimum value as the left shoulder node.

9. The identification method of claim 8, wherein the plurality of nodes further comprising a hip node, wherein the step of analyzing the sensor data and identifying at least one of the plurality of nodes corresponding to each of the plurality of wearable devices further comprising:

in response to a first value of a gyroscope signal excluding the right shoulder node and the left shoulder node being greater than the signal threshold and a wearable device that corresponds to the first value is not the right shoulder node and not the left shoulder node, determining the wearable device that corresponds to the first value as the hip node.

10. The identification method of claim 9, wherein the plurality of nodes further comprising a body node, wherein the step of analyzing the sensor data and identifying at least one of the plurality of nodes corresponding to each of the plurality of wearable devices further comprising:

in response to a second value of the gyroscope signal excluding the right shoulder node, the left shoulder node and the hip node being greater than the signal threshold and a wearable device that corresponds to the second value is not the right shoulder node, not the left shoulder node and not the hip node, determining the wearable device that corresponds to the second value as the body node.

11. An identification method, applicable to a wireless motion capturing system with a plurality of wearable devices, comprising:

receiving sensor data, wherein the sensor data is associated with a motion feature, and the motion feature corresponds to a plurality of nodes of a virtual avatar model, wherein the motion feature corresponds to a foot movement of the virtual avatar model, wherein the plurality of nodes comprising at least one left foot node and at least one right foot node, wherein the sensor data comprising a fifth pose signal; and analyzing the sensor data and identifying at least one of the plurality of nodes corresponding to each of the plurality of wearable devices, further comprising:

finding a timestamp with a gyroscope signal value greater than a threshold value from the fifth pose signal;

finding a wearable device that corresponds to the timestamp from the wearable devices;

determining the wearable device that corresponds to the timestamp as the at least one left foot node; and in response to the wearable devices being not the at least one left foot node, determining the wearable devices as the at least one right foot node.

12. The identification method of claim 11, wherein the plurality of nodes comprising a foot node, wherein the step of analyzing the sensor data and identifying at least one of the plurality of nodes corresponding to each of the plurality of wearable devices further comprising:

collecting an accumulation value of a squared gyroscope signal from the fifth pose signal;

finding the wearable device corresponding to a first value of the accumulation value of the squared gyroscope signal from the wearable devices corresponding to the at least one left foot node or the at least one right foot node; and determining the wearable device corresponding to the first value of the accumulation value of the squared gyroscope signal as the foot node.

13. The identification method of claim 12, wherein the plurality of nodes further comprising a lower leg node, wherein the step of analyzing the sensor data and identifying at least one of the plurality of nodes corresponding to each of the plurality of wearable devices further comprising:

in response to a wearable device corresponding to a second value of the accumulation value of the squared gyroscope signal is not the foot node, determining the wearable device corresponding to the second value of the accumulation value of the squared gyroscope signal as the lower leg node.

14. The identification method of claim 13, wherein the plurality of nodes further comprising an upper leg node, wherein the step of analyzing the sensor data and identifying at least one of the plurality of nodes corresponding to each of the plurality of wearable devices further comprising:

in response to a wearable device corresponding to a third value of the accumulation value of the squared gyroscope signal is not the foot node and not the lower leg node, determining the wearable device corresponding to the third value of the accumulation value of the squared gyroscope signal as the upper leg node.

15. An identification method, applicable to a wireless motion capturing system including a plurality of wearable devices for capturing movements of a user operating a virtual avatar model, wherein the motion feature corresponds to hand movement of the virtual avatar model, wherein the virtual avatar model comprising at least one left hand node, at least one right hand node, at least one head node, at least one central part node and at least one foot node, the identification method comprising:

analyzing first sensor data and identifying the plurality of wearable devices as the at least one left hand node and the at least one right hand node, further comprising:

collecting a gyroscope signal accumulation value, a gyroscope signal maximum value, and a gyroscope signal minimum value from that first pose signal;

in response to the gyroscope signal accumulation value being greater than a first threshold and the gyroscope signal maximum value being greater than a signal threshold, determining the wearable devices as the at least one left hand node; and in response to the gyroscope signal accumulation value being greater than the first threshold and the absolute value of the gyroscope signal minimum value being greater than the signal threshold, determining the wearable devices as the at least one right hand node, wherein the first sensor data is associated with a first motion feature, and the first motion feature corresponds to the at least one hand node of the virtual avatar model;

analyzing second sensor data and identifying the plurality of wearable devices as the at least one head node, wherein the second sensor data is associated with a second motion feature, and the second motion feature corresponds to the at least one head node of the virtual avatar model;

analyzing third sensor data and identifying the plurality of wearable devices as the at least one central part node, wherein the third sensor data is associated with a third motion feature, and the third motion feature corresponds to the at least one central part node of the virtual avatar model; and analyzing fourth sensor data and identifying the plurality of wearable devices as the at least one foot node, wherein the fourth sensor data is associated with a fourth motion feature, and the fourth motion feature corresponds to the at least one foot node of the virtual avatar model.

16. The identification method of claim 15, wherein the plurality of wearable devices are identified in sequential order of the at least one hand node, the at least one head node, the at least one central part node, and the at least one foot node.

17. The identification method of claim 15, further comprising:
receiving the first sensor data according to a first prompt message, wherein the first prompt message instructs the user to perform a hand movement associated with the first motion feature;
receiving the second sensor data according to a second prompt message, wherein the second prompt message instructs the user to perform a head movement associated with the second motion feature;
receiving the third sensor data according to a third prompt message, wherein the third prompt message instructs the user to perform a central part movement associated with the third motion feature; and
receiving fourth sensor data according to a fourth prompt message, wherein the fourth prompt message instructs the user to perform a foot movement associated with the fourth motion feature.

18. A wireless motion capturing system for capturing movements of a user operating a virtual avatar model, the wireless motion capturing system comprising:
a processing device; and
a plurality of wearable devices that communicate with the processing device, wherein
the wearable devices generate sensor data;
the processing device receives the sensor data, wherein the sensor data is associated with a motion feature, and the motion feature corresponds to a plurality of nodes of the virtual avatar model, wherein the motion feature corresponds to a hand movement of the virtual avatar model, wherein the plurality of nodes comprising at least one left hand node and at least one right hand node, wherein the sensor data comprising a first pose signal corresponding to the hand movement, and
the processing device analyzes the sensor data and identifies at least one of the plurality of nodes corresponding to each of the plurality of wearable devices, further comprising:
collecting a gyroscope signal accumulation value, a gyroscope signal maximum value, and a gyroscope signal minimum value from that first pose signal;
in response to the gyroscope signal accumulation value being greater than a first threshold and the gyroscope signal maximum value being greater than a signal threshold, determining the wearable devices as the at least one left hand node; and
in response to the gyroscope signal accumulation value being greater than the first threshold and the absolute value of the gyroscope signal minimum value being greater than the signal threshold, determining the wearable devices as the at least one right hand node.

19. The wireless motion capturing system of claim 18, wherein the virtual avatar model comprising at least one hand node, at least one head node, at least one central part node and at least one foot node, wherein the sensor data comprising first sensor data, second sensor data, third sensor data and fourth sensor data, wherein:
the processing device analyzes the first sensor data and identifying the plurality of wearable devices as the at least one hand node, wherein the first sensor data is associated with a first motion feature, and the first motion feature corresponds to the at least one hand node of the virtual avatar model;
the processing device analyzes the second sensor data and identifying the plurality of wearable devices as the at least one head node, wherein the second sensor data is associated with a second motion feature, and the second motion feature corresponds to the at least one head node of the virtual avatar model;
the processing device analyzes the third sensor data and identifying the plurality of wearable devices as the at least one central part node, wherein the third sensor data is associated with a third motion feature, and the third motion feature corresponds to the at least one central part node of the virtual avatar model; and
the processing device analyzes the fourth sensor data and identifying the plurality of wearable devices as the at least one foot node, wherein the fourth sensor data is associated with a fourth motion feature, and the fourth motion feature corresponds to the at least one foot node of the virtual avatar model.

* * * * *